US012782168B2

(12) United States Patent
Richards

(10) Patent No.: US 12,782,168 B2

(45) Date of Patent: Nov. 3, 2026

(54) SYSTEMS, METHODS, AND TECHNIQUES FOR VARYING OUTPUT RESOLUTION OF A SENSOR DEVICE

(71) Applicant: Allegro MicroSystems, LLC, Manchester, NH (US)

(72) Inventor: Zachary Richards, Epsom, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 181 days.

(21) Appl. No.: 18/788,327

(22) Filed: Jul. 30, 2024

(65) Prior Publication Data

US 2026/0036443 A1 Feb. 5, 2026

(51) Int. Cl.
*G01D 5/243* (2006.01)

(52) U.S. Cl.
CPC .................................... *G01D 5/243* (2013.01)

(58) Field of Classification Search
CPC ...................................................... G01D 5/243
See application file for complete search history.

(56) References Cited

U.S. PATENT DOCUMENTS

| | | | | |
|---|---|---|---|---|
| 8,729,890 | B2 | 5/2014 | Donovan et al. | |
| 10,481,218 | B2 | 11/2019 | Prentice et al. | |
| 10,495,485 | B2 | 12/2019 | Burdette et al. | |
| 10,495,700 | B2 | 12/2019 | Prentice et al. | |
| 10,571,301 | B2 | 2/2020 | Doogue et al. | |
| 10,598,739 | B2 | 3/2020 | Shoemaker et al. | |
| 10,656,170 | B2 | 5/2020 | Lim et al. | |
| 10,747,708 | B2 | 8/2020 | Kozomora et al. | |
| 10,866,118 | B2 | 12/2020 | Foletto et al. | |
| 10,908,229 | B2 | 2/2021 | Richards | |
| 11,368,533 | B2 | 6/2022 | Kozomora et al. | |
| 11,733,025 | B2 | 8/2023 | Lutz | |
| 11,762,043 | B2 | 9/2023 | Richards | |
| 12,107,710 | B2 | 10/2024 | Casu et al. | |
| 12,224,887 | B1 | 2/2025 | Halawani et al. | |
| 12,332,273 | B2 | 6/2025 | Friedrich et al. | |
| 12,348,243 | B2 | 7/2025 | Bastien et al. | |
| 2010/0057396 | A1* | 3/2010 | Oblizajek | G01P 21/02 702/147 |
| 2022/0291304 | A1* | 9/2022 | Richards | G01P 13/045 |
| 2024/0426862 | A1 | 12/2024 | Dono et al. | |
| 2025/0247276 | A1 | 7/2025 | Veilleux | |

(Continued)

OTHER PUBLICATIONS

"High Resolution GMR Wheel Speed and Distance Sensor IC"; Datasheet A19360; Allegro MicroSystems, LLC; Rev. 2; Dec. 2022; 18 pages.

(Continued)

*Primary Examiner* — Paresh Patel

(74) *Attorney, Agent, or Firm* — Daly, Crowley, Mofford & Durkee, LLP

(57) ABSTRACT

Disclosed are example systems, methods, and techniques for adaptively varying a resolution of information output from a sensor device. In particular, described are example systems, methods, and techniques for adaptively varying a resolution of information output from a sensor device based on a frequency of rotation of a target. Also described herein are example systems, methods, and techniques for conveying which of a series of events caused information to be output from a sensor device.

23 Claims, 15 Drawing Sheets

(56) References Cited

U.S. PATENT DOCUMENTS

2025/0251257 A1 8/2025 Rivas et al.

OTHER PUBLICATIONS

"Dual Output Differential Speed and Direction Sensor IC"; Datasheet ATS605LSG; Allegro MicroSystems, LLC; Rev. 5; Jul. 2021; 17 pages.
Bastien et al., "System Advantages of High-Resolution Wheel Speed Sensing"; Allegro MicroSystems, LLC, AN296228, Rev. 2; 2023; 8 pages.
Eisenbeis, "The Future of Automotive Wheel Sensing with GMR"; Allegro MicroSystems, LLC; Feb. 2022; 3 pages.

* cited by examiner

SYSTEMS, METHODS, AND TECHNIQUES FOR VARYING OUTPUT RESOLUTION OF A SENSOR DEVICE

BACKGROUND

As is known, sensors are used in various types of devices to measure and monitor properties of systems in a wide variety of applications. For example, sensors have become common in products that rely on electronics in their operation, such as automotive and motor control systems.

Some sensors monitor properties by detecting a magnetic field associated with proximity or movement of a target with respect to one or more magnetic field sensing elements. In magnetic field sensors including multiple magnetic field sensing elements, magnetic field signals from the sensing elements can be processed by separate processing channels to generate respective phase separated signals. One such magnetic field sensor is the Allegro MicroSystems, LLC ATS605LSG Dual Output Differential Speed and Direction Sensor integrated circuit (IC). Channel output, or speed signals, can be provided in the form of two-state binary signals having a frequency indicative of the speed of rotation of the target. Additional output signals can include additional information, such as a direction of a rotation of the target.

SUMMARY

Disclosed are example systems, methods, and techniques for adaptively varying a resolution of information output from a sensor device. In particular, described are example systems, methods, and techniques for adaptively varying a resolution of information output from a sensor device based on a frequency of rotation of a target. Also described herein are example systems, methods, and techniques for conveying which of a series of events caused information to be output from a sensor device. Using systems, methods, and techniques disclosed herein, a sensor device may provide a greater resolution of information (e.g., speed information, direction information) about a target when there is bandwidth for providing that greater resolution of information, such as when a target is rotating more slowly.

In accordance with some embodiments, there is provided a method. The method comprises determining a first frequency associated with an object, and identifying a first frequency band and first commutation sequence associated with the first frequency band based on the determined first frequency. The method also comprises receiving a first signal representing a characteristic of the object, and identifying a first commutation out of the first commutation sequence based on the received first signal. The method further comprises causing a first set of one or more pulses to be transmitted that identify the first commutation. The method also comprises determining a second frequency associated with the object, and identifying a second frequency band and second commutation sequence associated with the second frequency band based on the determined second frequency. The method further comprises receiving a second signal conveying information about the object, and identifying a second commutation out of the second commutation sequence based on the received second signal. The method still further comprises causing a second set of one or more pulses to be transmitted that identify the second commutation.

In some embodiments, the object is a magnetic target and the received first signal represents a magnetic field generated by the magnetic target and detected by a magnetic field sensing element.

In further embodiments, the method further comprises causing additional pulses to be transmitted with the first set of one or more pulses to provide additional information about the object.

In still further embodiments, the first frequency band and the second frequency band are each associated with a different resolution at which information about the object is transmitted.

In some embodiments, the first set of one or more pulses and the second set of one or more pulses are transmitted in an AK protocol format.

In further embodiments, the first frequency band is associated with a first frequency of rotation of the magnetic target and the second frequency band is associated with a second frequency of rotation of the magnetic target, wherein the first frequency of rotation is higher than the second frequency of rotation, and wherein the resolution associated with the first frequency band is lower than the resolution associated with the second frequency band.

In still further embodiments, the additional pulses correspond to bits of a word in an AK protocol format, and at least one of the pulses in the second set of one or more pulses corresponds to a bit added into the word.

In some embodiments, the additional pulses correspond to bits of a word in an AK protocol format, and at least one of the pulses in the second set of one or more pulses corresponds to a bit of the word.

In further embodiments, causing the first set of one or more pulses to be transmitted includes controlling a current source to modulate the one or more pulses of the first set as current pulses on a conductor.

In still further embodiments, causing the first set of one or more pulses to be transmitted includes controlling a voltage source to modulate the one or more pulses of the first set as voltage pulses on a conductor.

In some embodiments, the magnetic target is a ring magnet with sections of alternating magnetic polarity.

In further embodiments, the magnetic field sensing element comprises a giant magnetic magnetoresistor (GMR) field sensing element, tunnel magnetoresistor (TMR) field sensing element, Hall effect field sensing element, or receiving coil field sensing element.

In still further embodiments, the object is a non-ferrous metal target.

Furthermore, in accordance with some embodiments, there is provided a sensor device comprising at least one sensing element arranged to sense a characteristic of an object, a memory storing instructions, and a digital controller. The digital controller, when executing the instructions, is configured to determine a first frequency associated with the object, and identify a first frequency band and commutation sequence associated with the first frequency band based on the determined first frequency. The digital controller, when executing the instructions, is further configured to receive a first signal representing a characteristic of the object, and identify a first commutation out of the first commutation sequence based on the received first signal. The digital controller, when executing the instructions, is still further configured to cause a first set of one or more pulses to be transmitted that identify the first commutation. The digital controller, when executing the instructions, is also configured to determine a second frequency associated with the object, and to identify a second frequency band and second commutation sequence associated with the second frequency band based on the determined second frequency. The digital controller, when executing the instructions, is further configured to receive a second signal representing a characteristic of the object, and to identify a second commutation out of the second commutation sequence based on the received second signal. The digital controller, when executing the instructions, is still further configured to cause a second set of one or more pulses to be transmitted that identify the second commutation.

In some embodiments, the object is a magnetic target, the at least one sensing element is a magnetic field sensing element, and the received first signal represents a magnetic field generated by the magnetic target and detected by the magnetic field sensing element.

In further embodiments, the digital controller, when executing the instructions, is further configured to cause additional pulses to be transmitted with the first set of one or more pulses to provide additional information about the object.

In still further embodiments, the first frequency band and the second frequency band are each associated with a different resolution at which information about the object is transmitted.

In some embodiments, the first set of one or more pulses and the second set of one or more pulses are transmitted in an AK protocol format.

In further embodiments, the first frequency band is associated with a first frequency of rotation of the magnetic target and the second frequency band is associated with a second frequency of rotation of the magnetic target, wherein the first frequency of rotation is higher than the second frequency of rotation, and wherein the resolution associated with the first frequency band is lower than the resolution associated with the second frequency band.

In still further embodiments, the additional pulses correspond to bits of a word in an AK protocol format, and at least one of the pulses in the second set of one or more pulses corresponds to a bit added into the word.

In some embodiments, the additional pulses correspond to bits of a word in an AK protocol format, and at least one of the pulses in the second set of one or more pulses corresponds to a bit of the word.

In further embodiments, the at least one sensing element is arranged to sense fluctuations in a magnetic field caused by a biasing magnet placed proximate to the object.

Additionally, in accordance with some embodiments, there is provided a method. The method comprises determining a frequency associated with an object, and identifying a first frequency band out of at least three possible frequency bands based on the determined frequency, each of the at least three possible frequency bands having an associated commutation sequence. The method also comprises receiving a signal representing a characteristic of the object, and identifying a first commutation out of the commutation sequence associated with the first frequency band based on the received signal. The method further comprises causing a set of one or more pulses to be transmitted that identify the first commutation.

Before explaining example embodiments consistent with the present disclosure in detail, it is to be understood that the disclosure is not limited in its application to the details of constructions and to the arrangements set forth in the following description or illustrated in the drawings. The disclosure is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings are incorporated in and constitute part of this specification. The drawings, together with the description, illustrate and serve to explain the principles of various example embodiments of the disclosure.

The drawings are not necessarily to scale, or inclusive of all elements of a system, emphasis instead generally being placed upon illustrating the concepts, structures, and techniques sought to be protected herein.

DETAILED DESCRIPTION

An object monitored by a sensor device is often referred to as a target. Accordingly, an object (e.g., ferromagnetic object, magnet) whose characteristics are sensed by the sensor device may be referred to as a "target" herein.

A target may be attached to a system to be monitored, such as a rotation object. For example, a target, such as a ring magnet, may be attached to an axle of a wheel or other type of rotation object, such that the target rotates as the rotation object rotates. That is, a target may be fixed to a rotation object, such that the target rotates with the rotation object at the same speed as the rotation object rotates. A sensor device may then monitor rotation of the target to obtain information about rotation of the rotation object.

The terms "connect," "connected," "connection," "wired," "interface," or "interfaced" herein should be interpreted to mean any way of electrically and/or mechanically connecting components, parts, or systems. For example, an electrical and/or mechanical connection may be established using wires, cables, traces on a printed circuit board (PCB), or interconnects within an integrated circuit (IC) or package. Electrical connections may also be established using wireless interfaces.

As used herein, the term "predetermined," when referring to a value or signal, is used to refer to a value or signal that is set, or fixed, in the factory at the time of manufacture, or by external control, e.g., programming, thereafter. As used herein, the term "determined," when referring to a value or signal, is used to refer to a value or signal that is identified by a circuit, controller, or processor during operation, after manufacture.

Figure 1A:
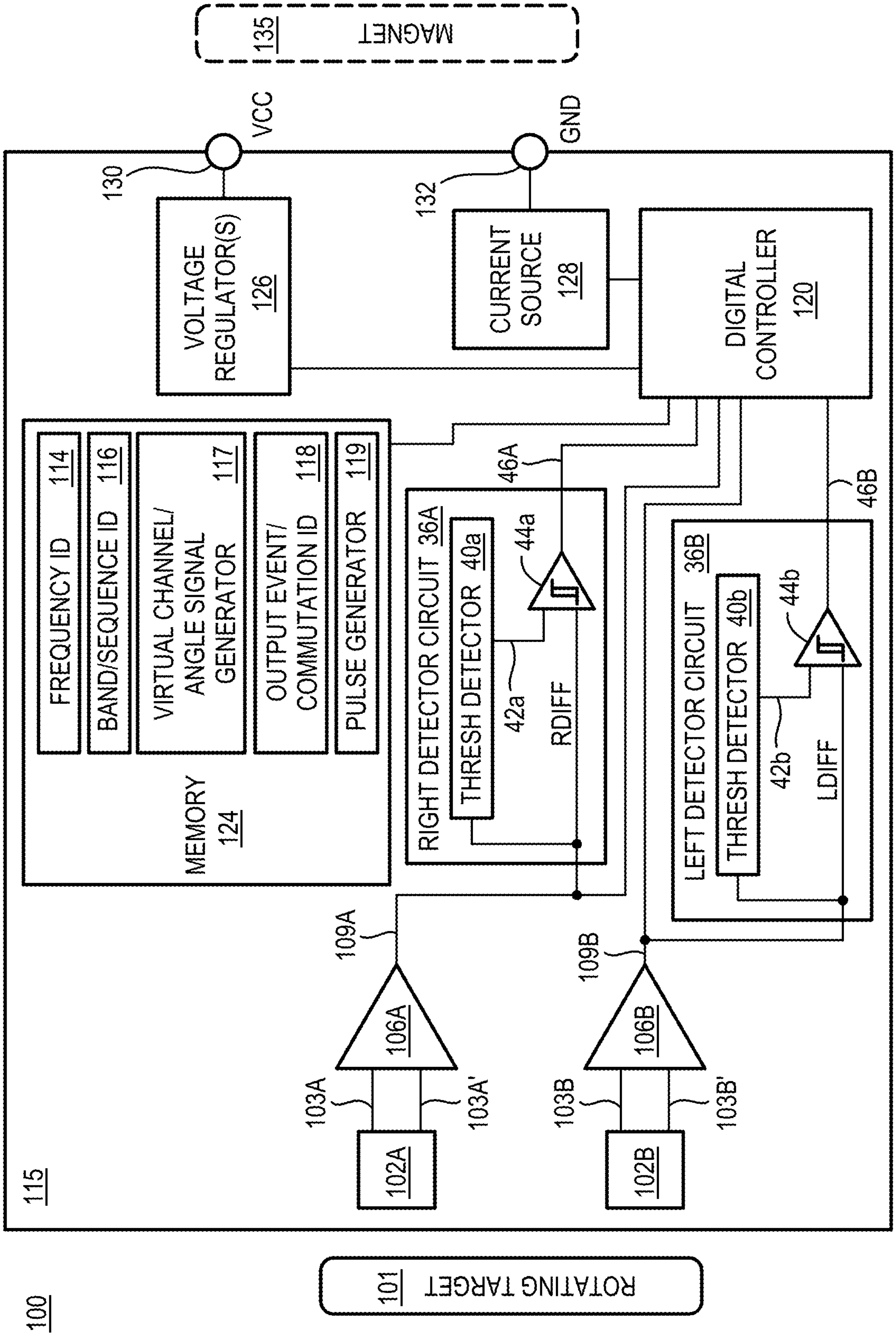
FIG. 1A shows a block diagram of an example sensor device that outputs information as current pulses, consistent with embodiments of the present disclosure.
Figure 1B:
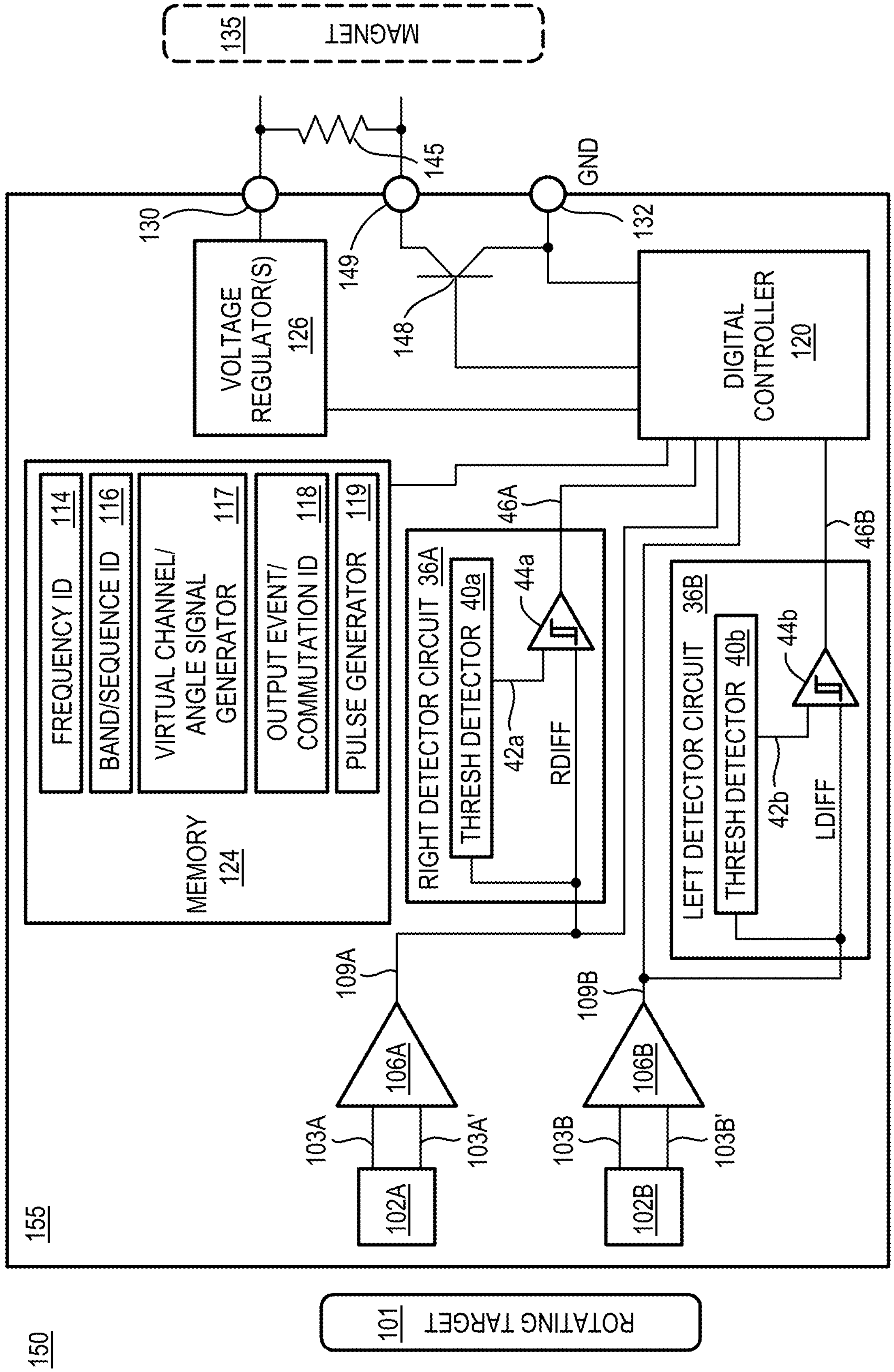
FIG. 1B shows a block diagram of an example sensor device that outputs information as voltage pulses, consistent with embodiments of the present disclosure.
Figure 1C:
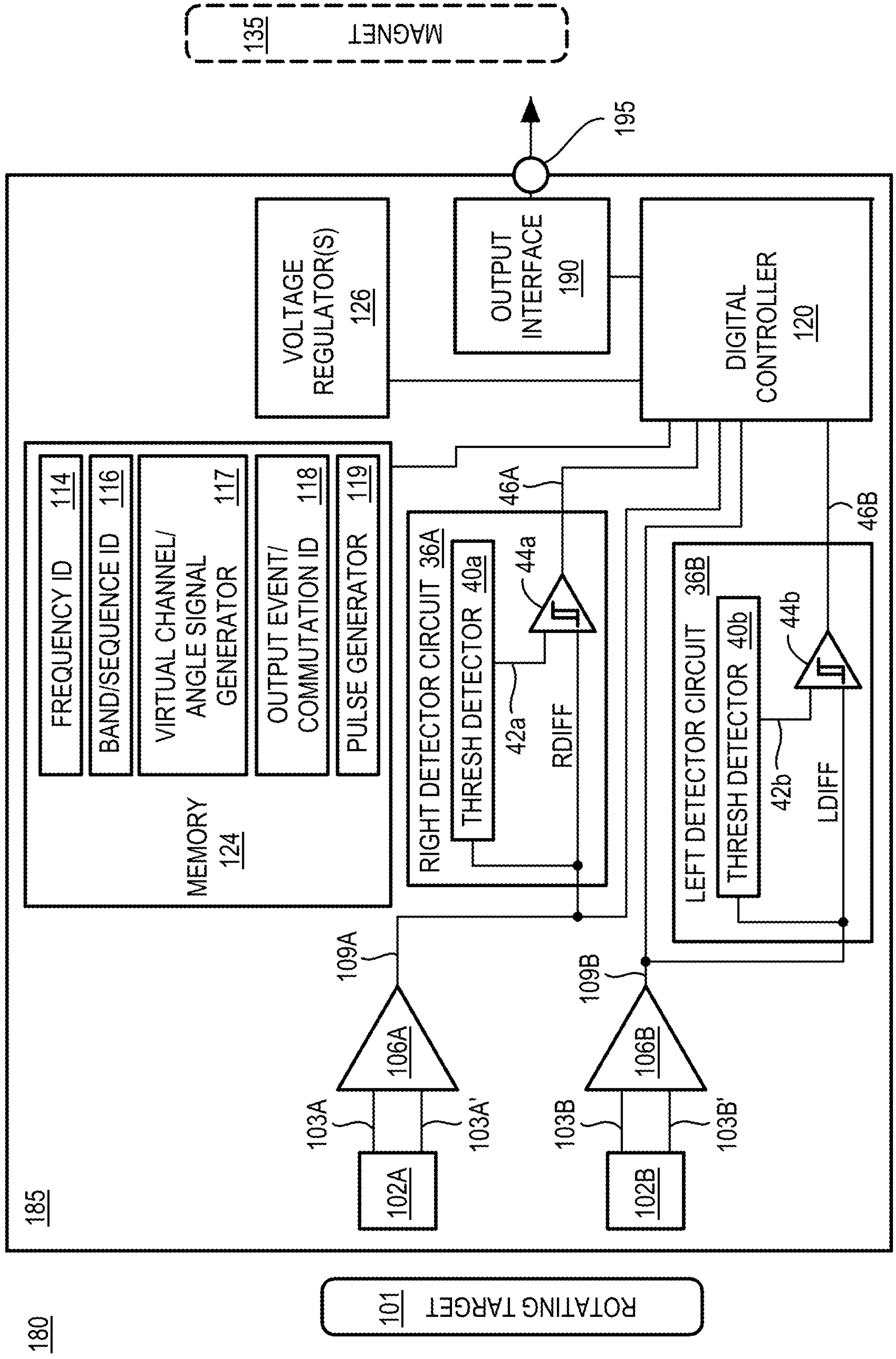
FIG. 1C shows a block diagram of an example sensor device that outputs information over an output interface, consistent with embodiments of the present disclosure.

FIGS. 1A, 1B, and 1C are block diagrams of example systems 100, 150, and 180 of the present disclosure, wherein like reference numbers indicate like elements. Systems 100, 150, and 180 may be used to sense characteristics of a target and to output information representative of the characteristics of the target. For example, system 100 of FIG. 1A may include a target 101 and a sensor device 115 used to sense characteristics about target 101, such as magnetic field changes generated by the target. System 150 of FIG. 1B may include a target 101 and a sensor device 155 used to sense characteristics about target 101. System 180 of FIG. 1C may include a target 101 and a sensor device 185 used to sense characteristics about target 101.

Target 101 may be, for example, a ring magnet with sections of alternating magnetic polarity (e.g., alternating north and south poles) (see, e.g., target 245 of FIGS. 2, 5), though the disclosure is not so limited. A person of ordinary skill in the art would recognize that any form of magnet may be used, including, for example, disc magnets, bar magnets, horseshoe magnets, cylinder magnets, or any other form of a magnet.

A person of ordinary skill in the art would also recognize that a magnetic target may be a permanent magnet that stays magnetized once magnetized, a temporary magnet that behaves like a magnet only when near a magnetic field, an electromagnet that behaves like a magnet only when electricity is applied, or any other type of magnet. A person of ordinary skill in the art would recognize that a magnetic target may be made of any type of magnetic material, such as neodymium (e.g., neodymium-iron-boron (NdFEB)), samarium cobalt (e.g., SmCo), alnico (e.g., aluminum, nickel, cobalt), ceramic or ferrite (e.g., strontium carbonate, iron oxide), or any other type of magnetic material. A magnetic target may be diametrically magnetized and/or axially magnetized. A magnetic target may have any number of alternating north and south poles.

In some embodiments, target 101 may comprise a ferromagnetic material. For example, a target may be a ferromagnetic gear that may be rotated and that has gear teeth. A system (e.g., system 100, system 150, system 180) may also include a biasing magnet 135 that is positioned in proximity to a ferromagnetic target, resulting in fluctuations of a magnetic field proximate to the ferromagnetic target as the ferromagnetic target rotates. Use of a biasing magnet 135 in such a system may be referred to as a "back-bias" arrangement. Biasing magnet 135 is illustrated in FIGS. 1A, 1B, 1C with a dotted line, as such a biasing magnet may not be necessary when target 101 is a magnet. Biasing magnet 135 may be any type of magnet previously discussed with respect to magnetic targets.

In some embodiments, target 101 may comprise one or more coils of wire, with current passing through the one or more coils of wire, such that a magnetic field is generated by the one or more coils of wire.

A sensor device (e.g., sensor device 115, sensor device 155, sensor device 185) may include one or more magnetic field sensing elements. For example, FIGS. 1A, 1B, and 1C illustrate sensor devices 115, 155, and 185, respectively, as comprising two magnetic field sensing elements, magnetic field sensing element 102A and magnetic field sensing element 102B. A magnetic field sensing element may be any type of element sensitive to a magnetic field. For example, a magnetic field sensing element may be a magnetoresistance element, a magnetotransistor element, a Hall-effect element, or a receiving coil element. For example, a magnetic field sensing element may be a magnetoresistance element, such as a giant magnetoresistance (GMR) element (e.g., a spin valve element), an Indium Antimonide (InSb) element, an anisotropic magnetoresistance (AMR) element, a tunneling magnetoresistance (TMR) element, or a magnetic tunnel junction (MTJ) element. A magnetic field sensing element may instead be a Hall-effect element, such as a planar Hall element, a vertical Hall element, or a circular vertical Hall (CVH) element. Alternatively, a magnetic field sensing element may be a receiving coil sensing element sensitive to a magnetic field generated by passing current through a coil of wire in the target.

A magnetic field sensing element may be a single element, or alternatively may include two or more magnetic field sensing elements. When a magnetic field sensing element includes two or more magnetic field sensing elements, those two or more magnetic field sensing elements may be arranged in one of various configurations, such as a half bridge or full (Wheatstone) bridge. In some embodiments, a sensor device (e.g., sensor device 115, sensor device 155, sensor device 185) may comprise a magnetic field sensing element 102A that comprises two magnetic field sensing elements (e.g., GMR elements) that are differentially paired, and a magnetic field sensing element 102B that comprises two magnetic field sensing elements (e.g., GMR elements) that are differentially paired. In some embodiments, a magnetic field sensing element 102A may comprise two magnetic field sensing elements that are differentially paired, and a magnetic field sensing element 102B may comprise two magnetic field sensing elements that are differentially paired, and one of the magnetic field sensing elements may be common to magnetic field sensing element 102A and magnetic field sensing element 102B.

A person of ordinary skill in the art would recognize that at least some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal-based or metallic magnetoresistance elements (e.g., GMR, TMR, AMR) and vertical Hall elements tend to have axes of sensitivity parallel to a substrate.

In some embodiments, magnetic field sensing elements (e.g., magnetic field sensing elements 102A and 102B) may be physically spaced apart from one another. In embodiments where a magnetic field sensing element comprises two or more magnetic field sensing elements, these magnetic field sensing elements may also be physically spaced apart from one another. For example, magnetic field sensing elements, in some embodiments, may be placed apart by approximately 1.5 millimeters (mm).

Depending on the type of sensor device and application requirements, a magnetic field sensing element may be a device made of a type IV semiconductor material such as Silicon (Si) or Germanium (Ge), or of a type III-V semiconductor material such as Gallium-Arsenide (GaAs) or an Indium compound such as Indium-Antimonide (InSb). In some embodiments, multiple magnetic field sensing elements in a sensor device may be of the same type of magnetic field sensing element. For example a sensor device (e.g., sensor device 115, sensor device 155, sensor device 185) may include two magnetic field sensing elements 102A and 102B, which may be of the same type (e.g., from the list above). In some embodiments, there may be different types of magnetic field sensing elements that work together in a sensor device. For example, a sensor device (e.g., sensor device 115, sensor device 155, sensor device 185) may include two magnetic field sensing elements 102A and 102B, which may be of different types (e.g., from the list above).

In some embodiments, magnetic field sensing elements (e.g., magnetic field sensing elements 102A, 102B) may output a voltage or current representative of a strength of a magnetic field. In some embodiments, magnetic field sensing elements may experience a change in resistance in response to a nearby magnetic field. For example, a magnetic field generated by a target 101 may cause a change in resistance in magnetic field sensing elements 102A, 102B. A voltage may then be detected across magnetic field sensing elements 102A, 102B by passing a current through the magnetic field sensing elements. The detected voltage may be proportional to the resistance of a magnetic field sensing element and may therefore be representative of the magnetic field that induced the resistance within the magnetic field sensing element.

The voltages sensed at the magnetic field sensing elements (e.g., magnetic field sensing elements 102A and 102B) may be processed and/or conditioned along signal paths, or "channels," before being sent to a controller (e.g., digital controller 120). A channel for processing/conditioning a detected voltage may include, for example, an amplifier and a detector circuit. For example, FIG. 1A illustrates a channel (referred to herein as "right" channel) as including a differential amplifier 106A that receives detected voltage signals (e.g., signals 103A, 103A') from differentially paired magnetic field sensing elements in magnetic field sensing element 102A. An amplified version of a difference between the voltage signals (e.g., signal 109A) may then be sent to a detector circuit 36A (referred to herein as a "right detector circuit"). The signal (e.g., signal 109A) may then be processed by detector circuit 36A and a signal 46A output to digital controller 120. Similarly, FIG. 1A illustrates another channel (referred to herein as "left" channel) as including a differential amplifier 106B that receives detected voltage signals (e.g., signals 103B, 103B') from differentially paired magnetic field sensing elements in magnetic field sensing element 102B. An amplified version of a difference between the voltage signals (e.g., signal 109B) may then be sent to a detector circuit 36B (referred to herein as a "left detector circuit"). The signal (e.g., signal 109B) may then be processed by detector circuit 36B and a signal 46B output to digital controller 120.

Signals 109A, 109B may be analog signals and may be generally sinusoidal in nature. Alternatively, analog-to-digital converters (not shown) may be present in a sensor device and may convert the analog signals to digital signals. Signals 109A, 109B may be referred to herein generally as measured magnetic field signals, which signals are indicative of a magnetic field affected by target 101. Thus, the sensor devices may be considered to include a right processing channel (or simply right channel) including differential amplifier 106A and right detector circuit 36A, and a left processing channel (or simply left channel) including differential amplifier 106B and left detector circuit 36B. Designations of "right" and "left" are arbitrary herein.

It will be appreciated that the term "channel" herein refers generally to processing circuitry and/or signals (e.g., signal 109A, signal 109B) associated with one or more magnetic field sensing elements. While FIGS. 1A, 1B, and 1C illustrate an amplifier and a detector circuit for this processing circuitry for each of these channels, such channels can include less, more, or different processing circuitry. For example, one or more analog-to-digital converters (ADCs) may be included in one or more of the channels, for converting analog signals to digital signals.

A sensor device may also include one or more controllers. The controller(s) may include digital and/or analog circuitry. For example, sensor device 115 of FIG. 1A, sensor device 155 of FIG. 1B, and sensor device 185 of FIG. 1C each include a digital controller 120. The controller may include any suitable type of processing circuitry, such as an application-specific integrated circuit (ASIC), a coordinate rotation digital computer (CORDIC) processor, a special-purpose processor, synchronous digital logic, asynchronous digital logic, a general-purpose processor (e.g., microprocessor without interlocked pipelined stages (MIPS) processor, x86 processor), etc. The one or more controllers may also include a system clock. The system clock may timestamp when commutations are identified (e.g., timestamp with an elapsed amount of time measured by the clock), such that identified commutations and the times at which the commutations are identified may be stored in memory (e.g., memory 124). One of skill in the art will recognize that the system clock need not be internal to the one or more controllers, and may instead be an external component connected to the one or more controllers.

The sensor device may also include one or more memories. For example, sensor device 115 of FIG. 1A, sensor device 155 of FIG. 1B, and sensor device 185 of FIG. 1C each include a memory 124. The memory may include any suitable type of volatile and/or non-volatile memory. In some embodiments, the memory may be a non-transitory computer-readable medium. By way of example, memory 124 may include a random-access memory (RAM), a dynamic random-access memory (DRAM), an electrically-erasable programmable read-only memory (EEPROM), and/or any other suitable type of memory. The memory may store instructions, that when executed by the controller(s), cause the controller(s) to carry out certain determinations, steps, processes, and/or calculations. For example, FIG. 1A illustrates memory 124 as storing instructions that, when executed by the controller(s), cause the controller(s) to (1) determine a frequency at which a target rotates (e.g., frequency identification (ID) instructions 114), (2) determine a frequency band and corresponding commutation sequence for the determined frequency (e.g., band/sequence ID instructions 116), (3) generate one or more virtual channels or angle signals (e.g., virtual channel/angle signal generator instructions 117) (4) identify a commutation and associated output event (e.g., output event/commutation ID instructions 118), and (5) cause one or more pulses to be generated for output to convey information about the target (e.g., pulse generator instructions 119). These instructions will be discussed in further detail herein. Although not shown, a memory (e.g., memory 124) may store additional instructions, such as instructions that, when executed by the controller(s), cause the controller(s) to determine, for example, direction of rotation of the target.

The sensor device may include one or more voltage regulators. For example, sensor 115 of FIG. 1A, sensor 155 of FIG. 1B, and sensor 185 of FIG. 1C each include voltage regulator(s) 126. Voltage regulator(s) may, for example, convert or regulate voltage to provide a stable power supply to the controller(s) (e.g., digital controller 120), magnetic field sensing element(s) (e.g., magnetic field sensing elements 102A, 102B), amplifier(s) (e.g., amplifier(s) 106A, 106B), detector circuit(s) (e.g., right detector circuit 36A, left detector circuit 36B), one or more memories (e.g., memory 124), current source (e.g., current source 128 of sensor device 115), output voltage rail 130, output interface (e.g., output interface 190), and/or any other circuitry.

The sensor device may also include one or more interfaces for conveying information about the target. For example, sensor device 115 includes a current source 128, which may modulate output current to output current pulses representing the information to be conveyed on a conductive interface through terminal 132. These current pulses may then be detected by another device connected to the conductive interface. For example, a sense resistor may be wired to the conductive interface, and the current pulses may be detected by the other device by detecting voltage changes across the sense resistor. A person of ordinary skill in the art would recognize there are many ways to construct such a current source, and so the construction of the current source will not be discussed here in detail. Any known technique for constructing a current source may be used, and should be considered to be within the scope of the disclosure herein. In some embodiments, a sensor device 115 may be implemented in a package (e.g., system-in-package (SIP) package) comprising two pins, one for Vcc 130, and one for a ground rail (GND) 132.

Alternatively, the sensor may convey information on a conductive interface using voltage pulses. For example, sensor device 155 includes a transistor (e.g., bipolar junction transistor 148) having a collector terminal coupled to a source voltage Vcc through a pull up resistor 145, an emitter terminal connected to a ground rail GND 132, and a base terminal connected to digital controller 120. Digital controller 120 may then control on/off states of the transistor through control of the base to output voltage pulses on a conductive interface through terminal 149. A person of ordinary skill would understand that other types of transistors, such as a metal-oxide-semiconductor field-effect transistor (MOSFET), may be used in place of bipolar junction transistor 148 to achieve the same result. A person of ordinary skill in the art would also recognize there are many ways to construct circuitry to control output of voltage pulses on a conductor, and so the construction of such circuitry will not be discussed here in detail. Any known technique for outputting voltage pulses may be used, and should be considered to be within the scope of the disclosure herein. In some embodiments, a sensor device 155 may be implemented in a package (e.g., SIP package) comprising three pins, one at terminal 130 for Vcc, one at terminal 149 for information output, and one at terminal 132 for ground (GND).

In some embodiments, a sensor may convey information on other types of output interfaces. For example, sensor device 185 includes an output interface 190, which may include one or more of a wired or wireless interface. By way of example, output interface 190 may include an Inter-Integrated Circuit ($I_2C$) interface, a Controller Area Network (CAN) bus interface, a WiFi interface, an Ethernet interface, a Universal Serial Bus (USB) interface, a local area network (LAN) interface, a cellular (e.g., 5G) interface, and/or any other suitable type of interface. In some embodiments, a sensor device 185 may be implemented in a package (e.g., SIP package) comprising a pin for Vcc (not shown), a pin for a ground rail (GND) (not shown), and one or more pins at terminal 195 as needed for the particular type of output interface.

In some embodiments, information may be conveyed as current pulses (sec, e.g., FIG. 1A), voltage pulses (sec, e.g., FIG. 1B), or another type of output (see, e.g., FIG. 1C) in accordance with a standardized protocol. In some embodiments, a sensor device may convey this information in accordance with an AK protocol. In some embodiments, a sensor device may convey this information as pulse-width modulated signals. Any suitable known protocol, such as any known event-based protocol, may be used to convey information out of the sensor device.

While symbols representing electronic circuits may be shown in FIGS. 1A, 1B, and 1C in the form of analog blocks or digital blocks, it is to be understood that analog blocks may be replaced by digital blocks that perform the same or similar functions and that digital blocks may be replaced by analog blocks that perform the same or similar functions.

It should also be understood that sensor device 115, sensor device 155, and/or sensor device 185 may comprise additional circuitry. It should further be understood that digital controller 120 may comprise additional circuitry. As one example, comparators may be used in one or more of the sensor devices and/or in one or more of the digital controllers. A comparator may be comprised of an analog comparator having a two state output signal indicative of an input signal being above or below a threshold level (or indicative of one input signal being above or below another input signal). A comparator may alternatively be comprised of a digital circuit having an output signal with at least two states indicative of an input signal being above or below a threshold level (or indicative of one input signal being above or below another input signal), respectively, or a digital value above or below a digital threshold value (or another digital value), respectively.

When the magnetic field sensing elements (e.g., magnetic field sensing element 102A, magnetic field sensing element 102B) are physically spaced apart from one another, signals (e.g., signals 46A) output from the channel corresponding to one of the magnetic field sensing elements may differ in phase from signals (e.g., signals 46B) output from the channel corresponding to the other of the magnetic field sensing elements. A phase difference between magnetic field signals output from magnetic field sensing elements may be based on the radius of the target and the number of pole pairs (or coils in a receiving coil implementation) of the target. In some embodiments, the phase separation between the signals may be approximately ninety degrees (i.e., the signals may be approximately in a quadrature relationship). However, it will be appreciated that other phase relationships between the signals are possible.

A detector circuit (e.g., right detector circuit 36A, left detector circuit 36B) may be included in a sensor device inside or outside of digital controller 120, and may be in line with and part of a channel. For example, a right detector circuit 36A may include a threshold detector circuit 40*a* and a comparator 44*a*. Threshold detector circuit 40*a* may detect positive and negative peaks of signal 109A, which is processed from magnetic field sensing element 102A. For example, threshold detector circuit 36A may receive signal 109A, and may be configured to detect positive and negative peaks of signal 109A, to identify a peak-to-peak value of signal 109A. Threshold detector circuit 40*a* may then generate signals representing threshold values off that peak-to-peak value. Signal 109A may be a signal that looks like a sine wave as the target rotates (see, e.g., plot 550 of FIG. 5). Threshold values may be selected to fall where the slope is steepest for such a wave, so as to offer greater accuracy in determining when the threshold value has been crossed and greater robustness against noise. For example, a first threshold (see, e.g., release point (RP) $B_{RP}$ 555 of plot 550 of FIG. 5) may be set to forty percent of the peak-to-peak value of the signal value, and a second threshold value (see, e.g., operate point (OP) Bop 553 of plot 550 of FIG. 5) may be set to sixty percent of the peak-to-peak value of the signal. However, the disclosure is not limited to these percentages. Any percentage value may be used as a threshold value. A comparator 44*a* may be coupled to receive one or more signals 42*a* representing one or more threshold values and may also be coupled to receive signal 109A. The comparator may be configured to generate a binary, two-state signal 46A (see, e.g., plot 560 of FIG. 5) for the right channel that has transitions when signal 109A crosses the first and second thresholds.

A similar binary, two-state signal 46B may be generated for the left channel. That is, a threshold detector circuit 40*b* may be configured to detect positive and negative peaks of signal 109B, to identify a peak-to-peak value of signal 109B. Threshold detector circuit 40*b* may then generate signals representing threshold values off that peak-to-peak value. For example, a first threshold value may be set to forty percent of the peak-to-peak value of the signal value, and a second threshold value may be set to sixty percent of the peak-to-peak value of the signal value. Again, these percentages are merely examples and the disclosure is not limited to these examples. A comparator 44*a* may be coupled to receive one or more signals 42*b* representing one or more threshold values and may also be coupled to receive signal 109B. The comparator may be configured to generate a binary, two-state signal 46B for the left channel that has transitions when signal 109B crosses the first and second thresholds.

While sensor devices 115, 155, and 185 are shown in FIGS. 1A, 1B, and 1C, respectively, as including detector circuits 36A, 36B, each having a particular topology (e.g., described above as peak-to-peak percentage detectors (threshold detectors)), it should be understood that any form of detectors may be used, such as peak-referenced detectors (peak detectors).

Figure 5:
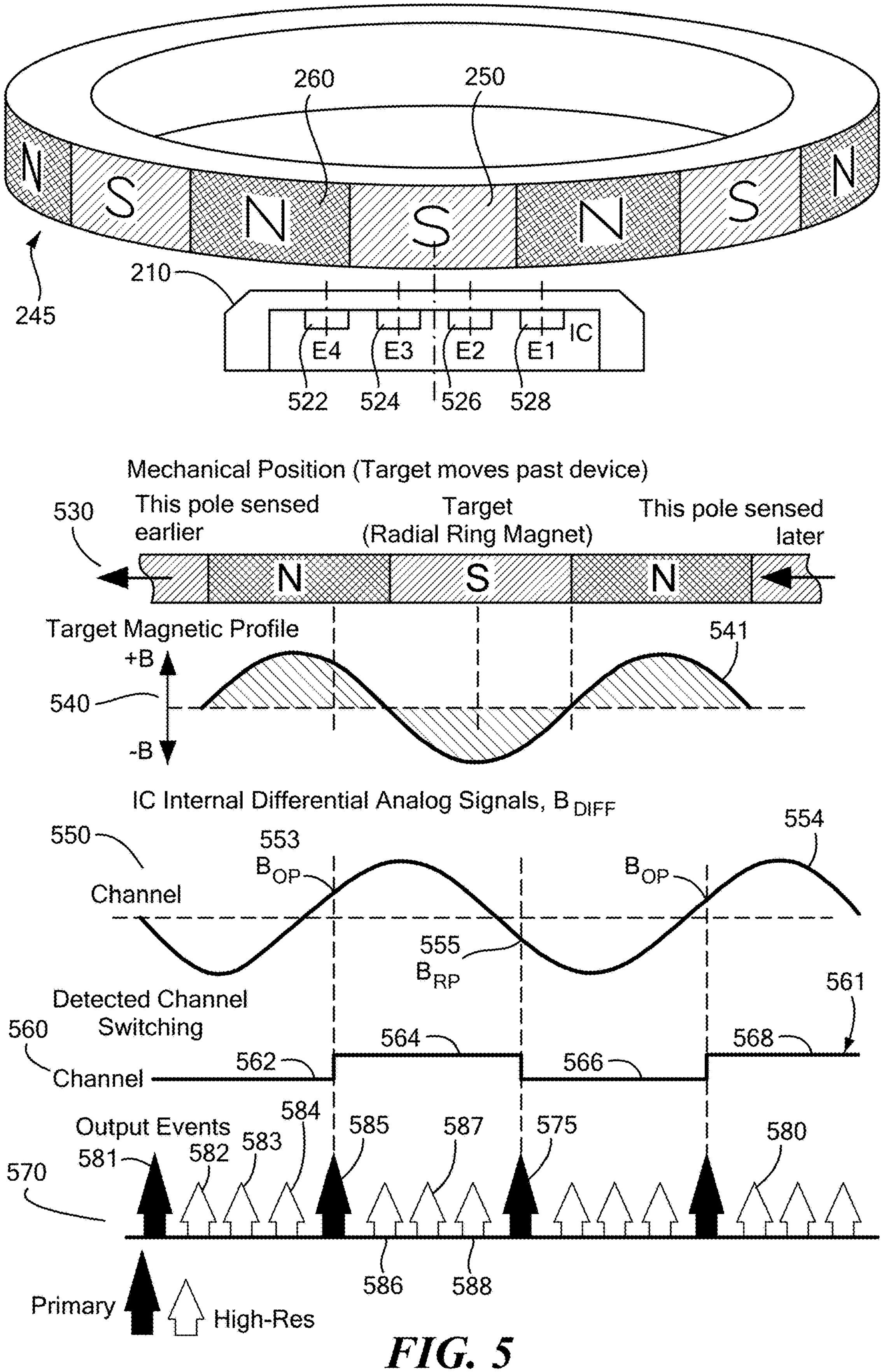
FIG. 5 shows an example system, including a sensor device and a target, a plot showing an example magnetic profile of the target as it rotates, a plot showing an example differential analog signal of a channel of the sensor device, a plot showing a detected switching of the channel by the sensor device, and a plot showing example output events of the sensor device.

Transitions at which signals cross defined threshold values may be referred to as “commutations” herein. For example, plot 570 of FIG. 5 shows output events occurring for commutations identified when a signal (e.g., signal 109A, signal 109B) from a channel crosses a threshold value Bop and when the signal from the channel crosses another threshold value $B_{RP}$.

When magnetic field sensing element 102A and magnetic field sensing element 102B are physically separated by some distance, the thresholds will be crossed at different times for the two channels and there will be a phase shift between the two output binary, two-state signals. That is, there may be a phase shift between signal 46A of the right channel and signal 46B of the left channel.

Furthermore, while the physical separation of magnetic field sensing elements and their differential coupling to generate measured magnetic field signals (e.g., signals 109A, 109B) illustrates one way to generate phase separated measured magnetic field signals, other configurations and techniques are also possible. For example, channels can be based on (i.e., can process) signals from independent (i.e., not differentially coupled) magnetic field sensing elements and the phase separation of the resulting measured magnetic field signals can be determined by the angular difference of the magnetic field sensing element positions and/or by the use of different types of magnetic field sensing elements that have axes of maximum sensitivity in different planes. In some embodiments, some channels may be based on signals from independent magnetic field sensing elements and other channels may be based on differentially coupled signals from a plurality of magnetic field sensing elements. Additional magnetic field sensing element configurations may be found in U.S. patent application Ser. No. 15/596,514 (now U.S. Pat. No. 10,495,485), titled “Magnetic Field Sensors and Output Signal Formats for a Magnetic Field Sensor,” filed on May 16, 2017, assigned to the Assignee of the subject application and incorporated by reference herein in its entirety.

Movement speed of target 101 may be detected in accordance with the frequency of either of the phase separated channel signals 46A, 46B. In this way, channel signals 46A, 46B may be considered to contain redundant target speed information. It should be appreciated that a direction of rotation of target 101 may be determined from a relative phase or relative time difference (e.g., lag or lead) of a particular edge transition in signal 46A as compared with a particular corresponding edge transition in signal 46B. Therefore, a relative lag or a lead of edges of signals 46A, 46B may be used to identify a direction of rotation of target 101.

Figure 2:
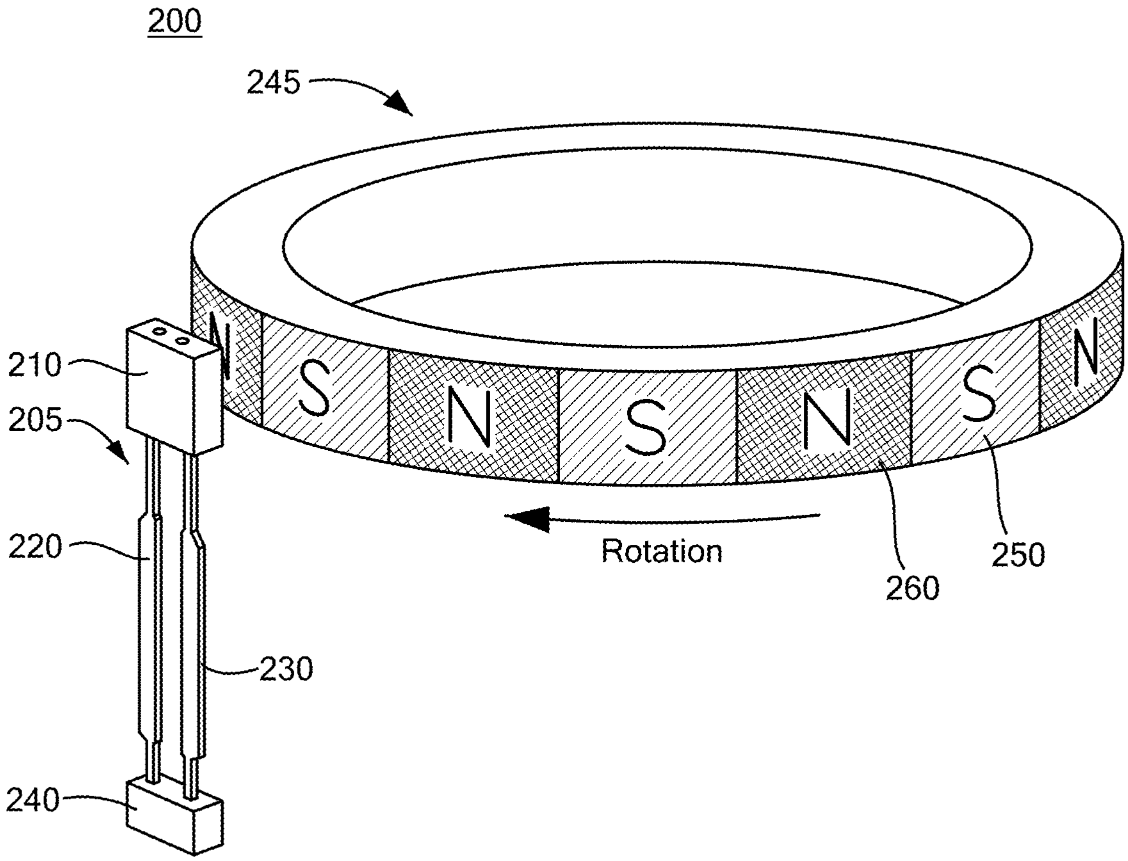
FIG. 2 shows an example system, including a sensor device and a magnetic target.

FIG. 2 shows an example of a two-pin sensor device 205. Components of sensor device 115 shown in FIG. 1A, for example, may be placed in a SIP package 210 as shown in FIG. 2. One of pins 220 and 230 may be a Vcc terminal (see, e.g., FIG. 1A) and the other of pins 220 and 230 may be a ground (GND) terminal (see, e.g., FIG. 1A). 240 may be a structural piece (e.g., plastic piece) that holds pins 220 and 230 in position. Sensor device 205 may measure magnetic field signals of a target as it rotates. FIG. 2 shows an example where the target is a ring magnet 245 with alternating magnetic poles (e.g., north poles 260, south poles 250). Ring magnet 245 may be attached to a larger rotating object, such as a wheel of a vehicle. Monitoring rotation of ring magnet 245 by sensing the magnetic fields associated with ring magnet 245 as it rotates may allow sensor device 205, or a device downstream of sensor device 205 (e.g., an electronic control unit (ECU)) that receives information from sensor device 205, to determine characteristics of the object (e.g., wheel) to which ring magnet 245 is attached, such as a rotation speed and/or rotation direction of that object.

One or more virtual magnetic field signals may be generated in response to the measured magnetic field signals (e.g., signals 109A, signals 109B). The term "virtual magnetic field signal" is used herein to refer to a signal that is indicative of a magnetic field affected by a target, but which signal is computationally generated based on one or more measured magnetic field signals generated from one or more magnetic field sensing elements.

Digital controller 120 may receive and process phase-separated measured magnetic field signals 109A, 109B and generate one or more virtual magnetic field signals based on the measured magnetic field signals. Digital controller 120 may also generate one or more virtual channel output signals (e.g., additional binary, two-state signals) based on these virtual magnetic field signals. These additional binary, two-state signals can be generated in a similar fashion to the manner in which the binary, two-state signals of the right and left channels are generated, but in this case by comparison of virtual magnetic field signals to one or more thresholds rather than by comparison of measured magnetic field signals to one or more thresholds. Transitions between the binary states of these virtual channel output signals may also be considered to be commutations, and output events may be generated based on these commutations. As a result, by generating virtual magnetic fields and virtual channel output signals, any desired number of commutations per pole-pair of the target may be identified (sec, e.g., plot 570 of FIG. 5, showing two "primary" output events based on identified commutations in a measured channel signal and six "high-resolution" output events based on identified commutations in virtual channel signals, per pole-pair). To this end, digital controller 120 may execute virtual channel generator instructions (e.g., virtual channel/angle signal generator instructions 117). Digital controller 120, when executing the instructions, may be configured to generate one or more virtual channel output signals similar to channel output signals 46A, 46B. That is, digital controller 120 may include a detector in hardware or software that may provide functionality similar to that of detectors 36A, 36B, and a threshold generator in hardware or software that may provide functionality that is the same or similar to threshold detector circuits 40*a*, 40*b*. Memory 124 may be used to store values for use by digital controller 120 in performing these functions.

Digital controller 120 may generate a virtual magnetic field signal based on at least one of the measured magnetic field signals (e.g., signal 109A, signal 109B) and with a predetermined phase difference with respect to at least one of the measured magnetic field signals. In some embodiments, digital controller 120 may generate multiple virtual magnetic field signals based on at least one of the measured magnetic field signals (e.g., signal 109A, signal 109B), each with a predetermined phase difference with respect to at least one of the measured magnetic field signals. In some embodiments, phase differences for the virtual magnetic field signals may be selected such that the phase differences between the virtual magnetic field signals are evenly spaced. For example, if three virtual magnetic field signals are generated and one period of the measured magnetic field signal is considered to represent 360 degrees, one of the virtual magnetic field signals may be phase shifted by 45 degrees from the measured magnetic field signal, one of the virtual magnetic field signals may be phase shifted by 90 degrees from the measured magnetic field signal, and one of the virtual magnetic field signals may be phase shifted by 135 degrees from the measured magnetic field signal. In other embodiments, virtual magnetic field signals may be unevenly spaced with respect to at least one of the measured magnetic field signals.

Figure 3A:
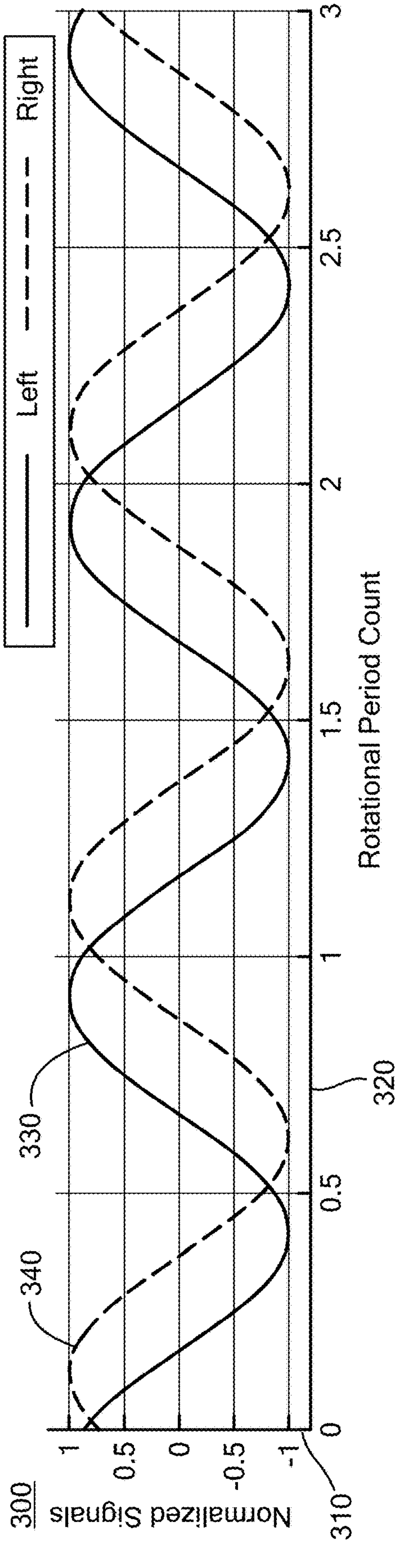
FIG. 3A shows a graph of example measured magnetic field signals.

FIG. 3A shows a graph 300 of example measured magnetic field signals. Y-axis 310 of graph 300 represents a strength of the magnetic field, and X-axis 320 represents a rotational period count. For example, a rotational period count of 1 may correspond to a rotation of the target such that a pole pair passes the sensor device, while a rotational period count of 0.5 may correspond to a rotation of the target such that half of the pole pair passes the sensor device. A rotational period count of 2 may correspond to a rotation of the target such that two pole pairs pass the sensor device.

330 is an example plot of a measured magnetic field signal from a magnetic field sensing element over a rotation of the target such that three pole pairs pass the sensor device (e.g., rotational period count of 3). Example plot 330 was generated by simulating example measured magnetic field strengths that may be detected by an example magnetic field sensing element 102B (sec FIGS. 1A, 1B, 1C) (e.g., left channel) as the target rotates such that a length of three pole pairs pass an example sensor device. In the example shown in FIG. 3A, plot 330 has a starting phase of 30 degrees (i.e., where a period of the cosine signal represents 360 degrees).

340 is an example plot of a measured magnetic field signal from a magnetic field sensing element over a rotation of the target such that three pole pairs pass the sensor device (e.g., rotational period count of 3). Example plot 340 was generated by simulating example measured magnetic field strengths that may be detected by an example magnetic field sensing element 102A (see FIGS. 1A, 1B, 1C) (e.g., right channel) as the target rotates such that a length of three pole pairs passes an example sensor device. In the example shown in FIG. 3A, the measured magnetic field signals of plots 330 and 340 are separated by a phase shift of 75 degrees.

Figure 3B:
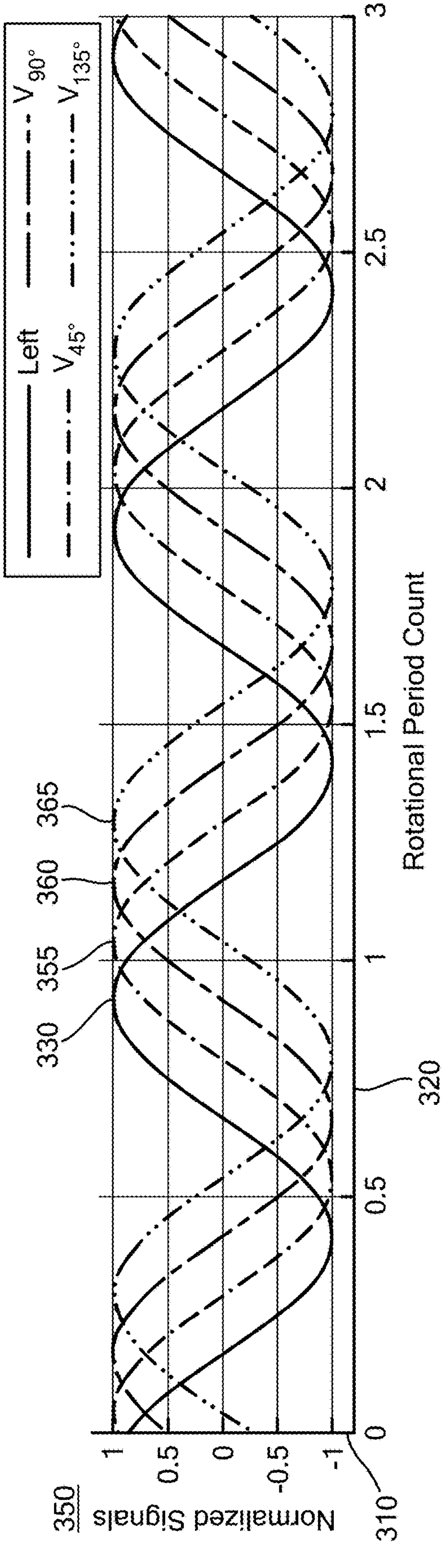
FIG. 3B shows a graph of an example measured magnetic field signal and example virtual magnetic field signals.

FIG. 3B shows a graph 350 of an example measured magnetic field signal and example virtual magnetic field signals. Y-axis 310 of graph 350 represents a strength of the magnetic field, and X-axis 320 represents a rotational period count (as discussed above with respect to FIG. 3A).

330 is an example plot of a measured magnetic field signal from a magnetic field sensing element (e.g., left channel) over a rotation of the target such that three pole pairs pass the sensor device, as discussed above with respect to FIG. 3A. 355 is an example plot of a virtual magnetic field signal that is generated by a digital controller (e.g., digital controller 120) and that is phase-shifted from the measured magnetic field signal 330 by 45 degrees. 360 is an example plot of a virtual magnetic field signal that is generated by the digital controller and that is phase-shifted from the measured magnetic field signal by 90 degrees. 365 is an example plot of a virtual magnetic field signal that is generated by the digital controller and that is phase-shifted from the measured magnetic field signal by 135 degrees. As previously discussed, example plot 330 was generated by simulating example measured magnetic field strengths that may be detected by an example magnetic field sensing element (e.g., left channel) as the target rotates such that a length of three pole pairs pass an example sensor device. Example plots 355, 360, and 365 were generated by simulating virtual signals that may be generated by an example digital controller of an example sensor device. Although three virtual magnetic field signals are shown in FIG. 3A, the disclosure is not so limited. Any number of evenly or unevenly spaced virtual magnetic field signals may be generated by a digital controller of a sensor device.

As discussed, in some embodiments two thresholds may be set for each magnetic field signal. Thus, in the example of one measured magnetic field signal and three virtual magnetic field signals shown in FIG. 3B, eight commutations may be identified per pole pair as the target is rotated. One of skill in the art would recognize that, depending on the number of virtual channels generated, any number of commutations may be identified per pole pair. In the examples discussed above where two thresholds are set per magnetic field signal, the number of commutations per pole pair may be a power of 2. For example, if only the measured magnetic field signal were used, 2 commutations may be identified. If the measured magnetic field signal and one virtual magnetic field signal were used, 4 commutations may be identified. If the measured magnetic field signal and three virtual magnetic field signals were used, 8 commutations may be identified.

Detector circuity and/or software in digital controller 120 may be used to process each virtual magnetic field signal to generate a respective virtual channel output signal based on crossings of the virtual magnetic field signals with threshold level values, similar to the manner in which detector circuits 36A, 36B may process signals 109A, 109B as discussed above. In some embodiments, threshold level values may be set to the same values as set by detector circuits 36A, 36B, while in some embodiments the threshold level values may be set to different values. In some embodiments, threshold level values for the detector circuits may be set at 40% and 60% of a peak-to-peak value of the virtual magnetic field signal, with 40% of the peak-to-peak value representing a release point ($B_{RP}$) threshold and 60% of the peak-to-peak value representing an operate point (Bop) threshold. As with the measured magnetic field signals 109A, 109B and detector circuits 36A, 36B, when a virtual magnetic field signal crosses a threshold level value, the respective virtual channel output signal may transition between binary states (i.e., from a high state to a low state or from a low state to a high state).

Figure 3C:
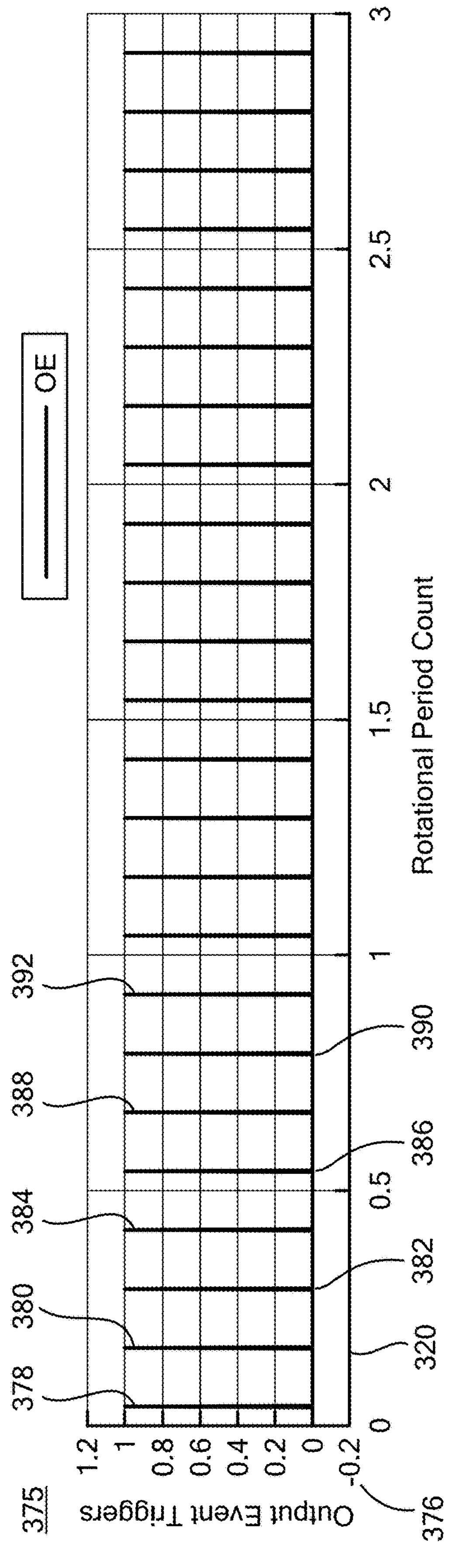
FIG. 3C shows a graph of example output events.

FIG. 3C shows a graph 375 of example output events generated based on identified commutations. Y-axis 376 of graph 375 represents a level of an output signal (e.g., current), and X-axis 320 represents a rotational period count (as discussed above with respect to FIG. 3A).

As shown in FIG. 3C, when a measured magnetic field signal and three virtual magnetic field signals are each monitored for crossings of two threshold values, eight commutations are identified and eight corresponding output events (e.g., output events 378, 380, 382, 384, 386, 388, 390, 392) are generated. Although each output event is illustrated in FIG. 3C as having a pulse with an amplitude of 1, it should be recognized that each output event may actually include a pulse train of current pulses, and that pulses in such a pulse train may have the same or different current amplitudes (sec, e.g., FIGS. 7A, 7B, 8).

Additional details regarding the generation and use of virtual magnetic field signals and virtual channels are disclosed in U.S. patent application Ser. No. 16/290,017, now U.S. Pat. No. 10,598,739, titled "Magnetic Field Sensors Having Virtual Signals," filed on Mar. 1, 2019, assigned to the Assignee of the subject application and incorporated by reference herein in its entirety, and in U.S. patent application Ser. No. 16/686,439, now U.S. Pat. No. 10,866,118, titled "High Resolution Magnetic Field Sensors," filed Nov. 18, 2019, assigned to the Assignee of the subject application and incorporated by reference herein in its entirety. For example, the virtual magnetic field signals discussed herein may be generated and/or utilized using processes, equations, and/or look-up tables disclosed in these applications.

In some embodiments, it may be desirable to identify a large number (e.g., greater than eight) of commutations per pole pair. As discussed above, any number of commutations may be identified by generating additional virtual magnetic field signals. However, when it is desired to identify large numbers of commutations, the number of virtual magnetic field signals to be generated and monitored may become onerous and require a lot of processing power in the digital controller. This may increase the cost and/or size of the sensor device. Thus, in some embodiments, it may be desirable to utilize another technique for identifying commutations.

In some embodiments, a magnetic field signal may be obtained that is phase-shifted from a measured magnetic field signal by 90 degrees. For example, two magnetic field sensing elements (e.g., magnetic field sensing elements 102A, 102B) may be physically positioned such that their channels produce signals 109A, 109B that are phase-shifted by 90 degrees. Alternatively, a virtual magnetic field signal may be generated that is phase-shifted from at least one of the measured magnetic field signals (e.g., magnetic field signals 109A, 109B) by 90 degrees. With two magnetic field signals that are phase-shifted by 90 degrees, an angle value may be calculated by taking an arctangent of one of the magnetic field signals divided by the other magnetic field signal. For example, an angle value may be determined at any given time by dividing a value of a measured magnetic field signal at that time over a value of a 90 degree phase-shifted magnetic field signal at that time (or vice versa) and then taking the arctangent of the result. This is given by the formula below, where M is a value of a magnetic field signal (measured or virtual) at a given time, P is a value of a 90 degree phase-shifted magnetic field signal (measured or virtual) at that time, and θ represents the calculated angle value at that time:

$$\theta = arctangent\left(\frac{M}{P}\right) \quad \text{Equation 1}$$

This equation may be used to record angle measurements over time.

Figure 4A:
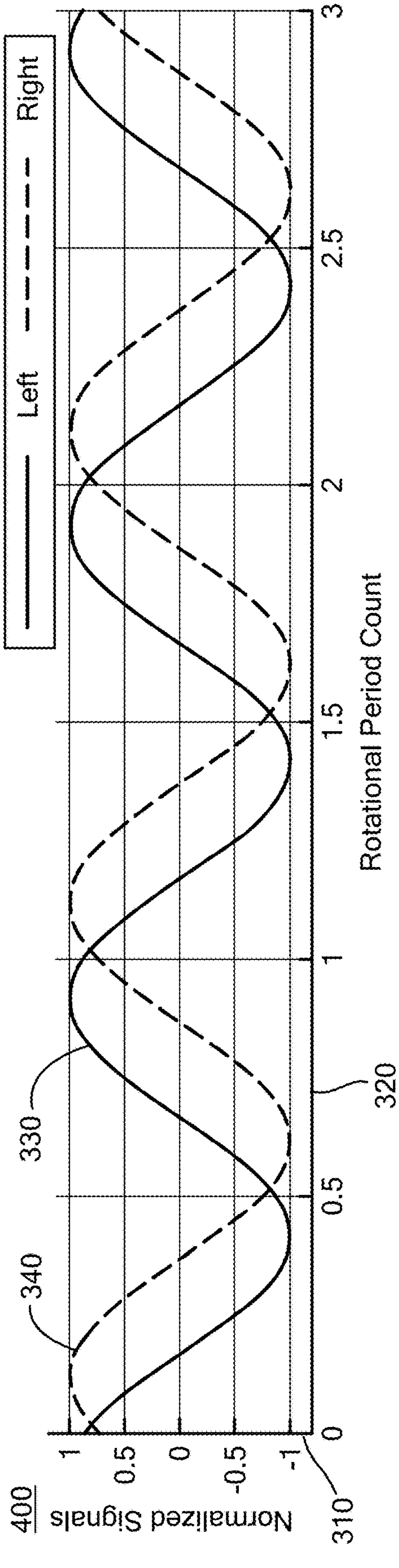
FIG. 4A shows a graph of example measured magnetic field signals.

FIG. 4A shows a graph 400 of example measured magnetic field signals. Graph 400 is the same as graph 300 of FIG. 3A. Like in FIG. 3A, Y-axis 310 of graph 400 represents a strength of the magnetic field, and X-axis 320 represents a rotational period count. Like in FIG. 3A, 330 is an example plot of a measured magnetic field signal from a magnetic field sensing element over a rotation of the target such that three pole pairs pass the sensor device (e.g., rotational period count of 3). For example, 340 may correspond to the measured magnetic field strengths detected by magnetic field sensing element 102A (see FIGS. 1A, 1B, 1C) (e.g., left channel) as the target rotates such that a length of three pole pairs passes the sensor device. And like in FIG. 3A, 340 is an example plot of a measured magnetic field signal from a magnetic field sensing element over a rotation of the target such that three pole pairs pass the sensor device (e.g., rotational period count of 3). For example, 340 may correspond to the measured magnetic field strengths detected by magnetic field sensing element 102A (see FIGS. 1A, 1B, 1C) (e.g., right channel) as the target rotates such that a length of three pole pairs passes the sensor device.

Figure 4B:
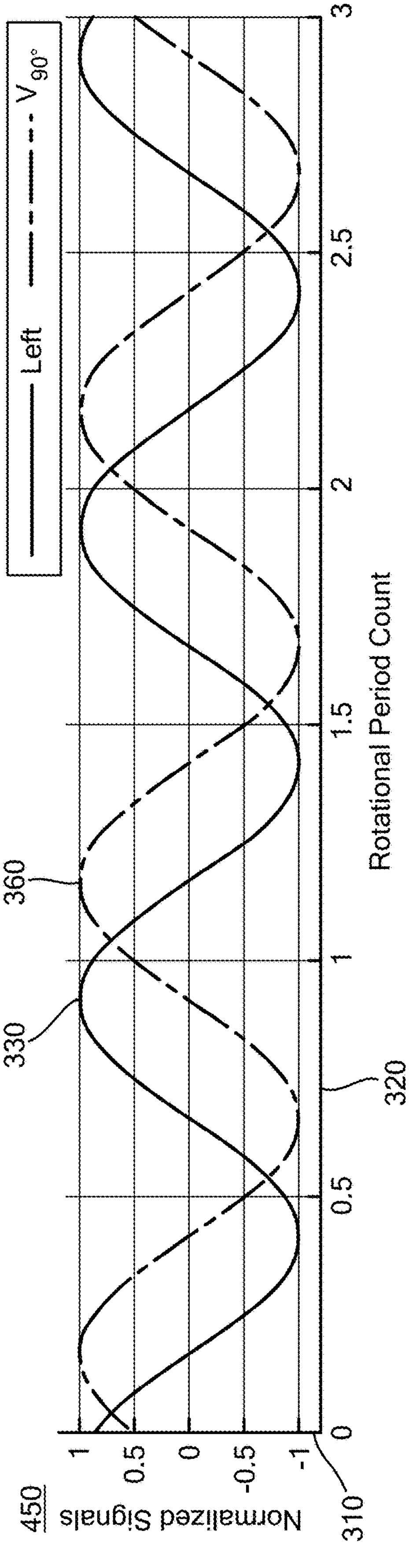
FIG. 4B shows a graph of an example measured magnetic field signal and an example virtual magnetic field signal.

FIG. 4B shows a graph 450 of an example measured magnetic field signal and an example virtual magnetic field signal. Y-axis 310 of graph 450 represents a strength of the magnetic field, and X-axis 320 represents a rotational period count (as discussed above with respect to FIG. 3A).

330 is an example plot of a measured magnetic field signal from a magnetic field sensing element (e.g., left channel) over a rotation of the target such that three pole pairs pass the sensor device, as discussed above with respect to FIG. 3A. 360 is an example plot of a virtual magnetic field signal that is generated by the digital controller and that is phase-shifted from the measured magnetic field signal by 90 degrees, as discussed above with respect to FIG. 3B.

Figure 4C:
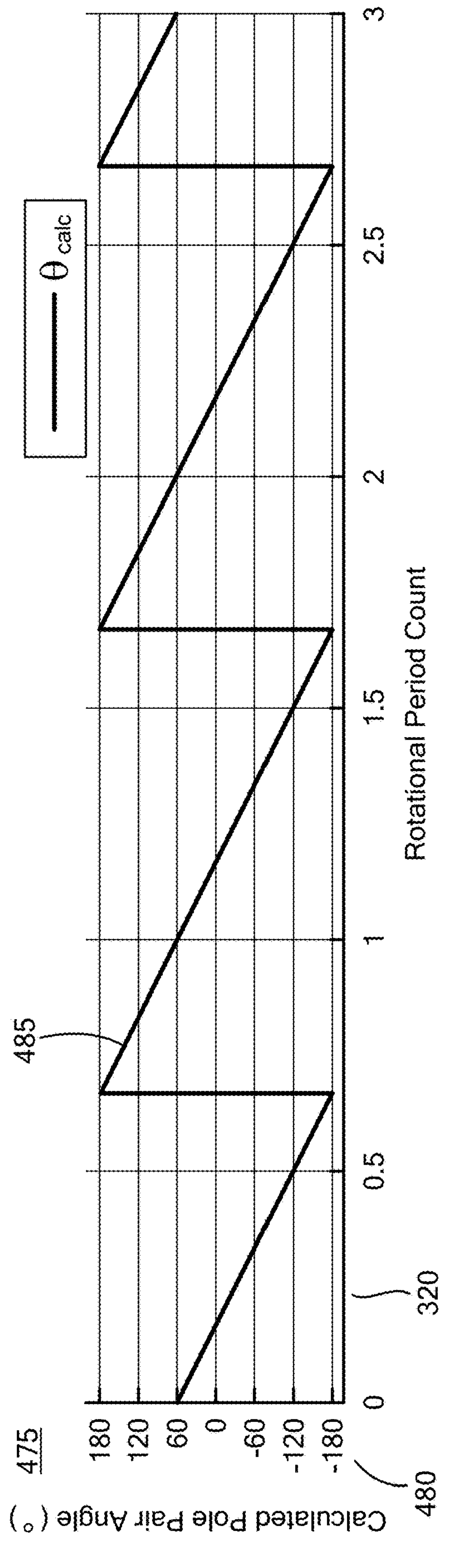
FIG. 4C shows a graph of an example angle signal.

As discussed above, with two magnetic field signals phase-shifted from one another by 90 degrees, such as 330 and 360, angle values may be calculated using Equation 1. FIG. 4C shows a graph 475 of example angle values over a rotation of a target. Y-axis 480 of graph 475 represents angle value and X-axis 320 of graph 475 represents rotational period count (as discussed above with respect to FIG. 3A).

Plot 485 is a plot of example angle values. As can be seen from graph 475, plot 485 of angle values may generally be a sawtooth function over the rotation of the target. As a result, the slope of the function is steep at any given time. Any number of threshold level values may then be set by a detector in hardware (sec, e.g., detector circuits 36A, 36B) or in software to record any number of commutations based on these angle measurements. These thresholds may be set at regular intervals (e.g., 10 degrees, 20 degrees, 30 degrees) or irregular intervals. Thus, by calculating angle values over time, any number of commutations, including large numbers of commutations, may be identified per pole pair based on the angle values, without having to generate an onerous number of virtual channels. Additional details regarding the generation and/or use of such angular data in identifying commutations are disclosed in U.S. patent application Ser. No. 16/686,439, now U.S. Pat. No. 10,866,118, titled "High Resolution Magnetic Field Sensors," filed Nov. 18, 2019, assigned to the Assignee of the subject application and incorporated by reference herein in its entirety.

FIG. 5 shows an example target 245 (e.g., ring magnet) and an example sensor device 210. Example target 245 may have alternating north 260 and south 250 poles. Example sensor device 210 may include two magnetic field sensing elements, each of which may comprise two differentially-coupled magnetic field sensing elements. That is, a magnetic field sensing element corresponding to a right channel may comprise magnetic field sensing elements E1 528 and E3 524, differentially coupled, and a magnetic field sensing element corresponding to a left channel may comprise magnetic field sensing elements E2 526 and E4 522, differentially coupled. In some embodiments, magnetic field sensing element E1 528 may be physically spaced approximately 1.5 mm apart from magnetic field sensing element E3 524, and magnetic field sensing element E2 526 may be physically spaced approximately 1.5 mm apart from magnetic field sensing element E4 522, though the disclosure is not so limited.

FIG. 5 also shows diagrams and plots, including a diagram 530 of example mechanical positions of target 245, a graph 540 of an example corresponding magnetic profile of the target, a graph 550 of an example corresponding magnetic field signal measured by the sensor device, a graph 560 of example corresponding detected channel switching events, and a graph 570 of example corresponding output events based on identified commutations.

Diagram 530 shows example mechanical positions of the target, with alternating north and south poles that pass by the sensor device as the target rotates. Graph 540 shows an example magnetic profile of the target corresponding to the mechanical positions of the target shown in diagram 530. The Y-axis of graph 540 represents amplitude of the magnetic field signal in Tesla. The X-axis of graph 540 corresponds to the mechanical positions of the target shown in diagram 430. Plot 541 represents the magnetic field strength sensed in a channel of sensor device 210 when the corresponding mechanical position shown in diagram 530 is centered over sensor device 210.

Graph 550 shows an example magnetic field signal measured by the sensor device. The Y-axis of graph 550 may represent, for example, a measured amplitude (e.g., voltage) that represents the magnetic field strength of the target, and the X-axis of graph 550 corresponds to the mechanical positions of the target shown in diagram 530. Plot 554 represents the magnetic field strength (e.g., measured magnetic field signal 109A, measured magnetic field signal 109B) measured by a channel of the sensor device when the corresponding mechanical position shown in diagram 530 is centered over sensor device 210. In this example, plot 554 corresponds to a measured magnetic field signal that is the result of two differentially-coupled magnetic field sensing elements in a channel. That is, the measured magnetic field strength (i.e., $B_{DIFF}$) at any mechanical position of the target may correspond to a difference between the magnetic field strengths sensed at two different differentially-coupled magnetic field sensing elements (e.g., within magnetic field sensing element 102A or within magnetic field sensing element 102B) within a channel. A first threshold level value (e.g., $B_{RP}$ 555) may correspond to 40% of the peak-to-peak value of the $B_{DIFF}$ signal, and a second threshold level value (e.g., $B_{OP}$ 553) may correspond to 60% of the peak-to-peak value of the $B_{DIFF}$ signal. Graph 550 illustrates where the thresholds are exceeded by the $B_{DIFF}$ signal.

Graph 560 shows an example channel output signal corresponding to the mechanical positions of the target shown in diagram 530. The Y-axis of graph 560 represents an amplitude of a channel output signal, such as an amplitude in voltage or current, and the X-axis of graph 560 corresponds to the mechanical positions of the target shown in diagram 530. Plot 561 shows how the amplitude of the channel output signal changes based on the mechanical position of the target. As shown in graph 560, the channel output signal may transition between binary states (e.g., voltage levels or current levels corresponding to 0s and 1s) when predetermined threshold level values (e.g., $B_{OP}$, $B_{RP}$) are crossed by a measured magnetic field signal (e.g., magnetic field signal 109A, magnetic field signal 109B). In this example, the channel output signal transitions from a 0 562 to a 1 564 when the Bop threshold level value is crossed, from 1 564 to 0 566 when the $B_{RP}$ threshold level value is crossed, and from 0 566 to 1 568 when the $B_{OP}$ threshold level value is again crossed.

Graph 570 shows example output events corresponding to the mechanical positions of the target shown in diagram 530. The taller arrows (e.g., arrow 575) correspond to primary output events, and the shorter arrows (e.g., arrow 580) correspond to high-resolution output events. In general, primary output events may be generated for each commutation identified based on a threshold level value being crossed in the measured magnetic field signal, and high-resolution output events may be generated for each commutation identified based on a threshold level value being crossed in a virtual magnetic field signal (see, e.g., FIG. 3B) or angle signal (see, e.g., FIG. 4C). However, the disclosure is not so limited. For example, primary output events could be generated from virtual magnetic field signals or angle signals, and high-resolution output events could be generated from measured magnetic field signals. In some embodiments, one or more pulses of current or voltage may be output in response to an output event. In some embodiments, one or more of the pulses of current or voltage output in response to a primary output event may be greater in amplitude than pulses of current or voltage output in response to a high-resolution output event, and so primary output events are illustrated in graph 570 with taller arrows than are high-resolution output events.

In the example shown in graph 570, at least one measured magnetic field signal (e.g., magnetic field signal 109A, magnetic field signal 109B) may be monitored to identify commutations, and virtual output channels may also be monitored to identify commutations. For example, one measured magnetic field signal and three virtual magnetic field signals may be monitored (see, e.g., FIG. 3B). Primary output events may be generated when a measured channel output signal (e.g., signal 46A, signal 46B) corresponding to a measured magnetic field signal (e.g., magnetic field signal 109A, magnetic field signal 109B) changes states. That is, in graph 570, primary output event 581 may be generated when the channel output signal transitions to 0, and primary output event 585 may be generated when the channel output signal transitions to 1. High-resolution output event 582 may be generated when a virtual channel output signal of a virtual magnetic field signal that is 45 degrees phase-shifted from the measured magnetic field signal transitions to 0, and high-resolution output event 586 may be generated when that virtual channel output signal transitions to 1. High-resolution output event 583 may be generated when a virtual channel output signal of a virtual magnetic field signal that is 90 degrees phase-shifted from the measured magnetic field signal transitions to 0, and high-resolution output event 587 may be generated when that virtual channel output signal transitions to 1. High-resolution output event 584 may be generated when a virtual channel output signal of a virtual magnetic field signal that is 135 degrees phase-shifted from the magnetic field signal transitions to 0, and high-resolution output event 588 may be generated when that virtual channel output signal transitions to 1. Alternatively, output events may be generated based on output channel transitions caused by angle signal crossing thresholds, as discussed above with respect to FIG. 4C.

A sensor device (e.g., sensor device 110, sensor device 155, sensor device 185) may transmit information (e.g., via current pulses (e.g., FIG. 1A), via voltage pulses (e.g., FIG. 1B), via output interface (e.g., FIG. 1C)) to another device (e.g., an ECU) based on identified commutations. However, the amount of information that can be transmitted out of a sensor device may be limited. For example, certain output transmission protocols (e.g., AK protocol) may have standards defining minimum pulse widths, etc., thereby limiting the amount of information that can be transmitted within a given time. While a high resolution of information may be desired in order to provide tighter control over an object being sensed, providing that high resolution of information may not always be possible. For example, the faster a target rotates, the more pole pairs pass by a sensor device in a given amount of time. A sensor device may not be able to transmit information quickly enough to output a large number of output events corresponding to a large number of commutations per pole pair when a target is rotating at high frequency. On the other hand, when a target rotates slowly, a lower number of pole pairs will pass by the sensor device within the same amount of time. In such cases, it may be possible for the sensor device to output a large number of output events corresponding to a large number of commutations per pole pair, and such "high-resolution" of information may be desired.

For example, a target may be attached to a wheel of a vehicle. When the vehicle is traveling at high speeds (e.g., greater than 60 mph), the wheel and target may be rotating so quickly that the sensor device cannot transmit a large number of output events per pole pair. However, the sensor device may be able to transmit a smaller number of output events. This may be referred to as a "low-resolution" operation. When the vehicle is traveling at low speeds (e.g., less than 5 mph), the wheel and target may be rotating slowly, and the sensor device may have the bandwidth to transmit a large number of output events per pole pair. Rather than output data at the same "low-resolution" operation as when the target rotates quickly, it would be desirable to transmit more output events (i.e., at higher resolution) in situations when the target rotates more slowly. This would be particularly advantageous, for example, for self-parking applications where a high degree of accuracy at slow speeds may be required. The output of a greater number of output events at these slow speeds would be beneficial in achieving greater control over the wheels of the vehicle.

Generally, the term "bandwidth" will be used herein to refer to the amount of information (e.g., output events) that can be transmitted out of a sensor device within a given amount of time. The term "resolution" will be used herein to refer to the number of output events transmitted. The terms "high resolution" or "higher resolution" will be used to refer to a relatively greater number of output events being transmitted, the terms "low resolution" or "lower resolution" will be used to refer to a relatively lower number of output events being transmitted, and the term "mid-resolution" will be used to refer to a number of output events somewhere between the number of outputs events transmitted at high-resolution or low resolution.

Figure 6:
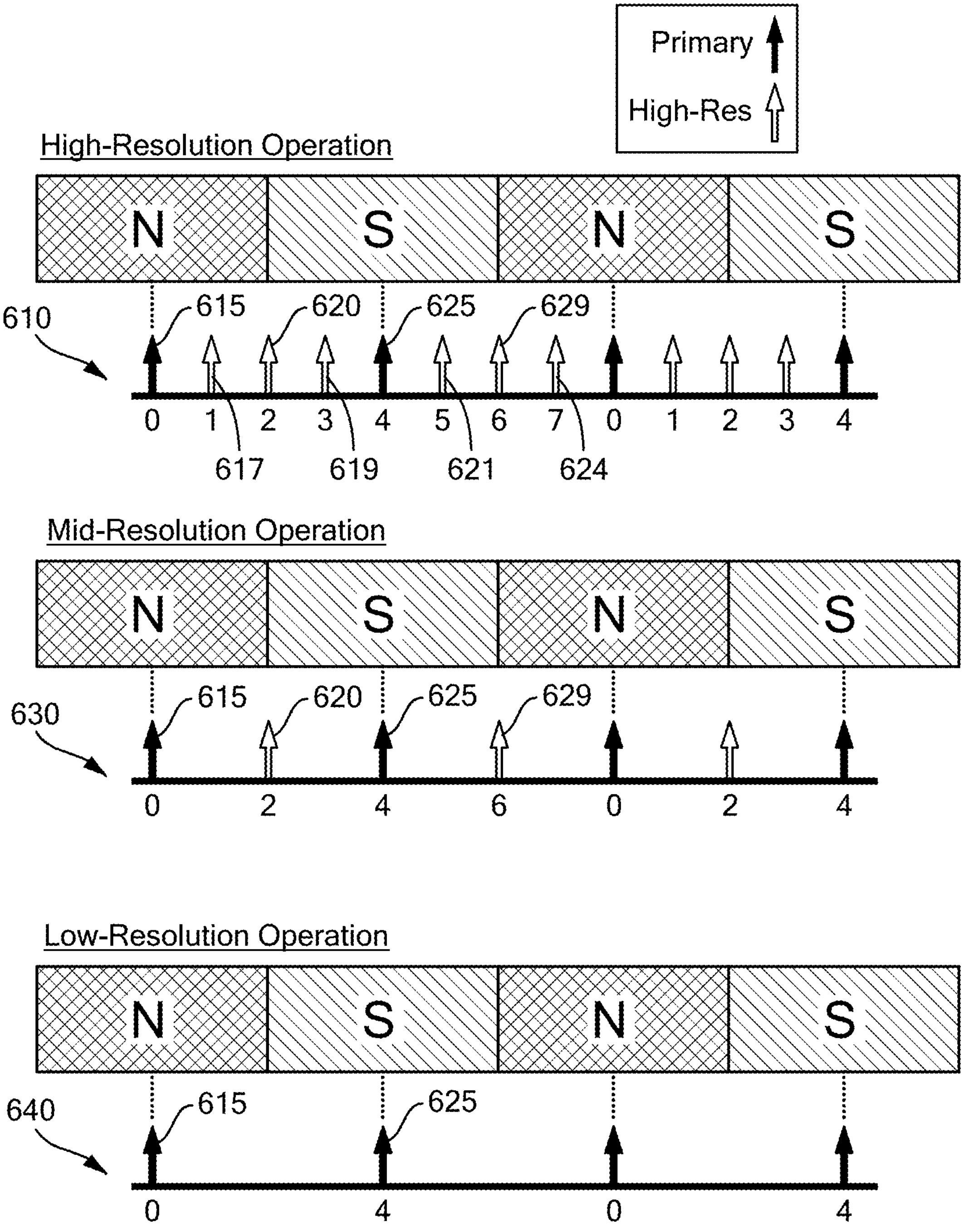
FIG. 6 shows a plot of example output events of a sensor device in a high-resolution operation, a plot of example output events of a sensor device in a mid-resolution operation, and a plot of example output events of a sensor device in a low-resolution operation.

FIG. 6 shows example magnet positions and plots, where plot 610 corresponds to an example high-resolution operation of a sensor device, plot 630 corresponds to an example mid-resolution operation of the sensor device, and plot 640 corresponds to an example low-resolution operation of the sensor device. In the example high-resolution operation shown in plot 610, a target may be rotating relatively slowly, such that eight output events (e.g., output events 0-7) may be transmitted per pole pair. As one example, a high-resolution operation may be used when the frequency of a measured magnetic field signal (e.g., signal 109A, signal 109B) is lower than a particular frequency value. The frequency may be, for example, a frequency of 200 Hz or lower, though the disclosure is not so limited. As previously discussed, a period of the measured magnetic field signal corresponds to one pole pair passing by the sensor device, such that a frequency of 200 Hz would correspond to the passing of 200 pole pairs per second. As shown in the example in plot 610, output events 0 615 and 4 625 may each correspond to a primary output event (e.g., based on a threshold level value being crossed by a measured magnetic field signal (e.g., signal 109A, signal 109B)), and output events 1 617, 2 620, 3 619, 5 621, 6 629, and 7 624 may each correspond to a high-resolution output event (e.g., based on threshold level values being crossed in virtual magnetic field signals (e.g., FIG. 3B) or an angle signal (e.g., FIG. 4C)).

In the example low-resolution operation shown in plot 640, a target may be rotating relatively quickly, such that two output events (e.g., output events 0 615 and 4 625) may be transmitted per pole pair. As one example, a high-resolution operation may be used when the frequency of a measured magnetic field signal (e.g., signal 109A, signal 109B) is higher than a particular frequency value. The frequency may be, for example, a frequency greater than 200 Hz, though the disclosure is not so limited. As shown in the example in plot 640, output events 0 and 4 may each correspond to a primary output event (e.g., based on a threshold level value being crossed by a measured magnetic field signal (e.g., signal 109A, signal 109B)) and no output events may be transmitted based on virtual channels or angle signals.

In some embodiments, a controller (e.g., digital controller 120 of FIGS. 1A, 1B, 1C) may continually monitor a frequency of a measured magnetic field signal (e.g., signal 109A, signal 109B) and automatically change between different modes of operation outputting different resolutions of information based on the frequency of the measured magnetic field signal. For example, a controller may determine that the frequency of a measured magnetic field signal is equal to or less than 200 Hz and may operate in a high-resolution operation. The controller may, for example, detect eight commutations and transmit eight corresponding output events per pole pair in this operation. Then, when the controller determines that the frequency of the measured magnetic field signal is greater than 200 Hz, it may automatically switch to a low-resolution operation. In low-resolution operation, the controller may, for example, detect two commutations and transmit two output corresponding output events per pole pair. The controller may also automatically switch from a low-resolution operation to a high-resolution operation upon determining that a frequency of the magnetic field signal is equal to or lower than a certain frequency value (e.g., 200 Hz).

In some embodiments, the controller may identify the same number of commutations regardless of mode of operation, but may transmit a lower number of output events in lower resolution modes of operation than in higher resolution modes of operation. For example, in a low-resolution mode of operation, a controller may identify eight commutations per pole pair, but transmit output events for only two of those eight commutations (see, e.g., plot 640), since there may only be enough bandwidth to transmit two output events per pole pair at a given high frequency.

In some embodiments, the frequency of the magnetic field signal may be determined based on commutations identified by the controller. For example, as discussed above, commutations may be identified based on channel switching events (e.g., plot 560 of FIG. 5), which correspond to a measured magnetic field signal (e.g., signal 109A, signal 109B) crossing a threshold level value (e.g., $B_{OP}$, $B_{RP}$) (e.g., plot 550 of FIG. 5). As previously discussed with respect to FIGS. 1A, 1B, and 1C, a sensor device may have a system clock. A controller may use the system clock to timestamp channel switching events, and may then utilize the time between two of the same type of channel switching event to calculate a frequency of rotation of the target for any given pole pair. That is, a first time may be associated with a channel output event transitioning from a 0 to a 1 (e.g., a $B_{OP}$ threshold level value being crossed by a magnetic field signal), and a second time may be associated with the next channel output event transitioning from a 0 to a 1 (e.g., $B_{OP}$ threshold level value again being crossed by the magnetic field signal). The difference between the first and second times may then be calculated, and the inverse of that time determined to calculate frequency, as shown in the equation below:

$$\text{frequency} = \frac{1}{\text{second time} - \text{first time}} \qquad \text{Equation 2}$$

Alternatively, the frequency may be determined based on times between channel output events transitioning from 1 to 0 (e.g., between $B_{RP}$ threshold level values being crossed by a magnetic field signal). In some embodiments, the frequency may be determined based on times between virtual channel output events, or channel output events corresponding to threshold level values being exceeded in an angle signal. A person of ordinary skill in the art would recognize that there are many other ways to determine frequency of rotation of a target based on magnetic field signals. Any known technique for determining a frequency of rotation of a target should be considered to be within the scope of the disclosure herein.

In some embodiments, the example discussed above with respect to high-resolution operation and low-resolution operation may be extended to additional modes of operation at additional resolutions. For example, when a target is rotating at a frequency within some intermediate frequency range, the sensor device may be capable of transmitting more output events than in a low-resolution mode of operation but not as many output events as in a high-resolution mode of operation. In such cases, it may be desirable to transmit some intermediate number of output events. Accordingly, a controller of the sensor device may automatically transition to a mid-resolution mode of operation. Plot 630 shows example output events transmitted during an example mid-resolution mode of operation. For example, in mid-resolution operation, four output events (e.g., output events 0 615, 2 620, 4 625, and 6 629) may be transmitted per pole pair. As shown in the example in plot 630, output events 0 615 and 4 625 may each correspond to a primary output event (e.g., based on a threshold level value being crossed by a measured magnetic field signal (e.g., signal 109A, signal 109B)) and output events 2 620 and 6 629 may each correspond to a high-resolution output event (e.g., based on a threshold level value being crossed by a virtual magnetic field signal or angle signal).

In some embodiments, additional modes of operation at additional resolutions may be provided. For example, an arbitrarily large number of output events corresponding to an arbitrarily large number of commutations may be transmitted per pole-pair so long as there is bandwidth for outputting that number of output events and so long as that number is a power of two, given by the equation below:

$$N_{comm} = 2^n \qquad \text{Equation 3}$$

where n is an integer and $N_{comm}$ is the maximum number of commutations that can be represented in output events. For example, in the example high-resolution mode previously discussed with respect to plot 610 of FIG. 6, n would equal 3, as eight commutations represented by eight output events is the maximum number of commutations represented in output data in that example. The number of allowable output events is limited by the amount of time it takes for the sensor to communicate the required data of the output events. However, by defining a set of frequency bands and associated commutation sequences, a maximum resolution may be offered at low frequencies of target rotation falling into a low frequency band and as the frequency of target rotation increases, the frequency of target rotation may fall into another frequency band with a different associated commutation sequence, and output events may be dropped. As a result, available output bandwidth may be utilized by a sensor device to output the highest resolution of information possible at any given rotation frequency of the target.

Figure 7A:
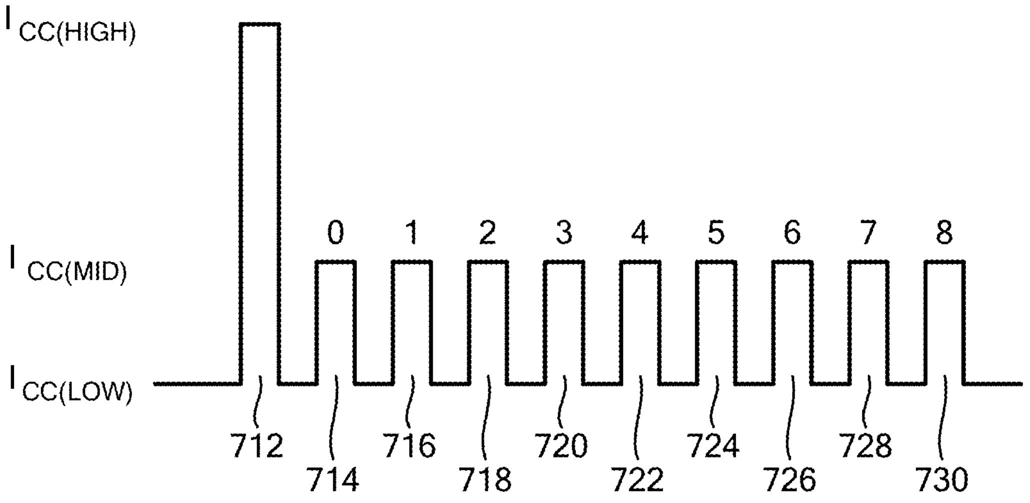
FIG. 7A shows a plot of example output current pulses that convey information about a target.

For example, a sensor device may output information in accordance with an AK protocol. One example of an output event of a sensor device, in accordance with AK protocol, may be a word consisting of 10 pulses—a single speed pulse, 8 additional information bits, and a single parity bit. FIG. 7A shows an example implementation of an AK protocol word having ten pulses. Speed pulse 712 may be output at a current level $I_{CC(HIGH)}$, and each of the additional bit pulses (e.g., pulses 714-728) and parity pulse (e.g., pulse 730) may be output at a current level $I_{CC(MID)}$ (corresponding to a 1) or $I_{CC(LOW)}$ (corresponding to a 0), though the disclosure is not so limited. Example bit definitions are provided below in Table 1. In some embodiments, $I_{CC(HIGH)}$ may correspond to approximately 28 milliamps (mA), $I_{CC(MID)}$ may correspond to approximately 14 mA, and $I_{CC(LOW)}$ may correspond to approximately 0 mA, though the disclosure is not so limited.

at the timing at which it receives speed pulses associated with primary output events and use that timing to determine a speed of rotation of the target. The ECU may further use predefined information about the system to which the target is attached, such as radius of a tire, to determine a speed at which the system is traveling (e.g., 60 mph). A person of ordinary skill in the art would recognize that speed pulses associated with any set of commutations (e.g., $B_{OP}$ commutations of measured/virtual/angle signals, $B_{RP}$ commutations of measured/virtual/angle signals) may be used by a device to determine rotation speed of the target.

The example air gap reserve bit 714 (e.g., bit number 0) may relate to whether the peak-to-peak amplitude of the measured magnetic field is less than some predetermined value. For example, when the peak-to-peak amplitude measured by a detector circuit (e.g., right detector circuit 36A, left detector circuit 36B) is less than some predetermined value, a 1 may be output by the sensor device to inform a downstream device (e.g., ECU) that the sensor device is too far from the target. The example status mode bit 716 (e.g., bit number 1) may relate to whether the sensor device is operating in RUN mode. For example, a 0 may be output when the sensor device is in RUN mode, and a 1 may be output when the sensor device is not in RUN mode (e.g., is in startup or calibration mode).

The example primary indication bit 718 (e.g., bit number 2) may be used to indicate whether an output event corresponds to a primary output event or standstill event, in which case a 1 may be output from the sensor device, or to a high-resolution output event, in which case a 0may be output from the sensor device. The device (e.g., ECU) receiving the output data from the sensor device may use this bit to determine, for example, whether a received AK protocol word corresponds to a primary commutation or to a high-resolution commutation.

TABLE 1

| Bit number | Field | Coding |
|---|---|---|
| — | Speed Pulse | $I_{CC(HIGH)}$ if primary or high-resolution pulse |
| 0 | Air Gap Reserve | 1 if $B_{DIFF(pk\text{-}pk)} < B_{LR(pk\text{-}pk)}$, 0 otherwise |
| 1 | Status Mode | 1 if running mode is not active, 0 otherwise |
| 2 | Primary Indication | 1 if primary pulse or standstill pulse, 0 if high-resolution pulse |
| 3 | Direction Validity | 1 if direction is value, 0 otherwise |
| 4 | Direction | 1 if forward rotation, 0 if reverse rotation |
| 5 | Air Gap Indication or High-Resolution Pulse (LSB) | LM/HR LSB |
| 6 | Air Gap Indication or High-Resolution Pulse | LM/HR |
| 7 | Air Gap Indication or High-Resolution Pulse | LM/HR MSB |
| 8 | Parity | 1 if parity including parity bit is even, 0 otherwise |

The example speed pulse bit 712 (e.g., bit number-) may be used by a device that receives the output data from a sensor device, such as an ECU of a vehicle, to determine a speed of rotation of a target. For example, an ECU may utilize speed pulses of primary output events to determine a speed of rotation of a target. As previously discussed, as a target rotates more quickly (i.e., at greater frequency), more pole pairs of the target will pass by the sensor device within a given period of time. A device, such as an ECU may look The example direction validity bit 720 (e.g., bit number 3) may be used to determine whether direction information transmitted in the AK protocol word is valid. For example, if the sensor device is being calibrated, the direction information may be invalid and a 0 may be output for this bit. When the sensor device is in normal operation, a 1 may be output for this bit. The example direction bit 722 (e.g., bit number 4) may be used to inform a device (e.g., ECU) receiving the AK protocol word of the direction of rotation of the target. For example, a 1 may indicate that the target is rotating in a forward direction, while a 0 may indicate that the target is rotating in a reverse direction. As discussed above, a controller of a sensor device may determine direction of rotation by comparing the relative phases of the output channel signals 46A, 46B or of the measured magnetic field signals 109A, 109B. When one of the signals leads the other, the controller may identify one direction of rotation for the target. When the other of the signals leads the former, the controller may identify the other direction of rotation for the target.

Example bit numbers 724, 726, 728 (e.g., bit numbers 5-7) may provide information regarding the air gap between the sensor device and the target when the AK protocol word corresponds to a primary output event (as indicated by bit number 2). For example, a peak-to-peak measurement of magnetic field strength (e.g., $B_{DIFF(pk-pk)}$ may be measured by one of the detector circuits (e.g., right detector circuit 36A, left detector circuit 36B) and the controller may determine that this peak-to-peak value falls within one of eight possible ranges. The three bits 5-7 may be used to inform a device receiving the AK protocol word of the corresponding range for this measurement (e.g., one of 8 different ranges of $B_{DIFF(pk-pk)}$).

When the AK protocol word corresponds to a high-resolution output event (as indicated by bit number 2), bit numbers 724, 726, 728 (e.g., bit numbers 5-7) may be used to identify a commutation that the AK protocol word represents. These bits may be referred to as commutation specific identification (CSI) bits herein. For example, in a high-resolution operation (e.g., plot 610 of FIG. 6), the three bits 5-7 may be used to indicate which of the eight possible output events (and corresponding commutations) the AK protocol word represents. As one example, the output events (and corresponding commutations) may be identified as shown in the table below.

TABLE 2

| Bit 7 | Bit 6 | Bit 5 | Commutation/Output Event Number |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

In some embodiments, bit numbers 724, 726, 728 (e.g., bit numbers 5-7) may also be used to identify a commutation that the AK protocol word represents when the AK protocol word corresponds to a low-resolution output event (e.g., a primary output event). In such a case, bit numbers 724, 726, 728 may be used to identify the commutation number of the primary output event rather than providing information regarding air gap as discussed above. For example, an AK protocol word may represent a primary output event number 0 by outputting a 0 for bit 5, a 0 for bit 6, and a 0 for bit 7. An AK protocol word may represent a primary output event number 4 by outputting a 0 for bit 5, a 0 for bit 6, and a 1 for bit 7. In some embodiments, AK protocol words may output information related to air gap when a commutation corresponding to one of the primary events in a rotational period is identified, and may output information regarding a commutation/output event number when the other one of the primary events in the rotational period is identified.

Example parity bit 730 (e.g., bit number 8) may be a 1 if the parity of the AK protocol word including the parity bit is even, and 0 otherwise, and may be used to determine whether there is an error in the AK protocol word.

The above description of how to represent information regarding a target in an AK protocol word is just an example, and should not be regarded as limiting. Any number of pulses conveying any variety of information may be used to convey information in accordance with AK protocol. A person of ordinary skill in the art would recognize that any of the above described information, or any other additional and/or alternative information, that the controller determines about the target may be conveyed using any combination of bit states in an AK protocol word. In some embodiments, for example, a sensor device may be designed to always transmit air gap information on bits 5-7, and three CSI bits (e.g., bit numbers 9-11) may be added onto the end of the pulse train (but before the parity bit) to represent the eight different commutation events.

Figure 7B:
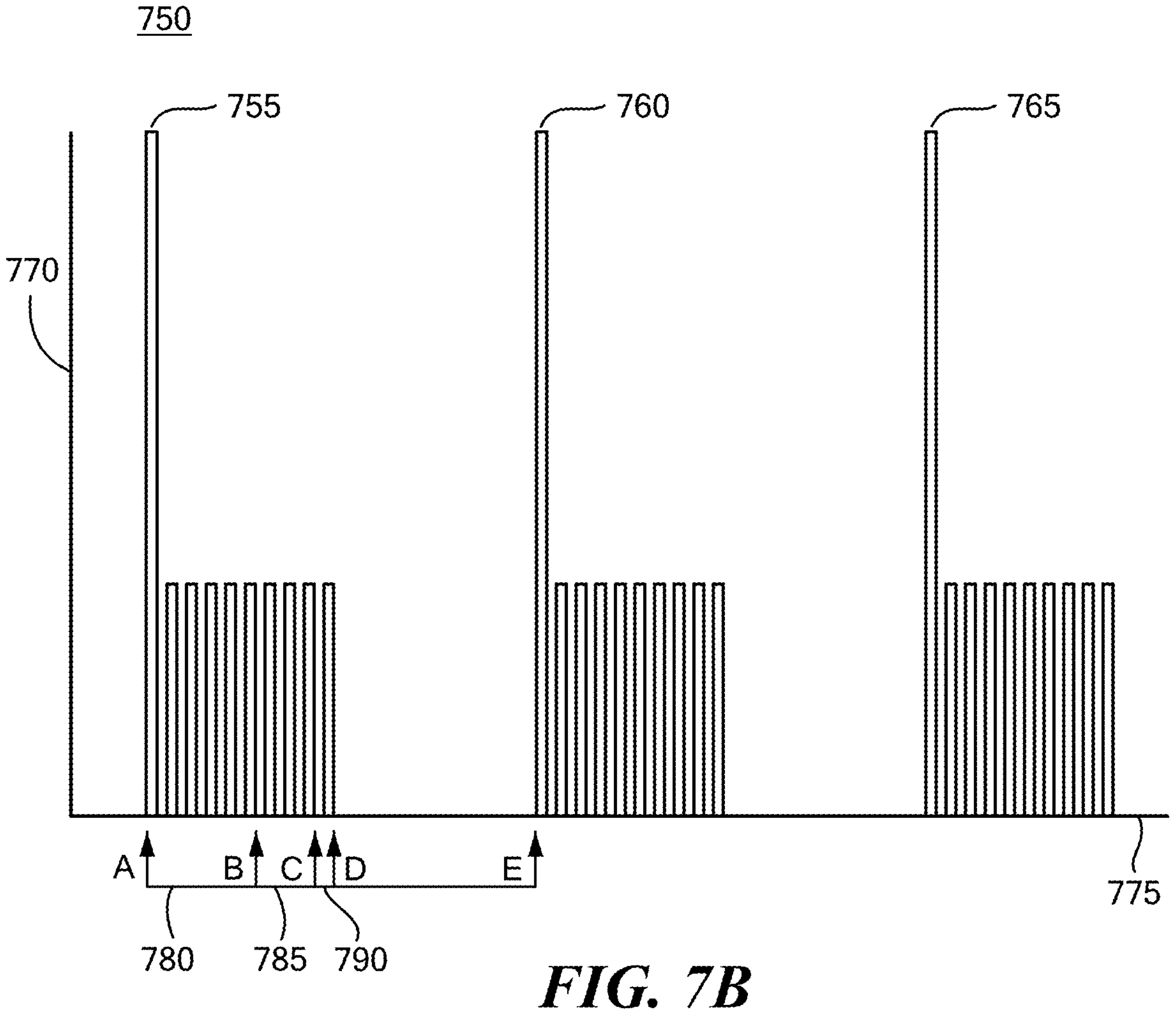
FIG. 7B shows a plot of example sets of output current pulses that convey information about a target.

FIG. 7B is a diagram 750 of an example output sequence of example AK protocol words (see, e.g., FIG. 7A and associated description) from a sensor device. For example, pulse train 755 represents one example AK protocol word, pulse train 760 represents another example AK protocol word, and pulse train 765 represents yet another example AK protocol word. Y-axis 770 of diagram 750 represents amplitude of current and X-axis 775 of diagram 750 represents time. Using the example bits described with respect to Table 1 above, the time between point A and point B in FIG. 7B may represent an amount of time 780 needed to transmit a speed pulse and bit numbers 0-4 of the example AK protocol word. The time between point B and point C in FIG. 7B may represent an amount of time 785 needed to transmit bit numbers 5-7 (e.g., CSI bits) of the example AK protocol word. The time between point C and D in FIG. 7B may represent an amount of time 790 needed to transmit bit number 8 of the example AK protocol word. A time between point D and E in FIG. 7B may represent a minimum off time reserved to avoid collision between pulses trains and during which no pulses may be transmitted.

Transmission of a full fidelity packet in accordance with AK protocol and with the information described above with respect to Table 1, would then correspond to a timing given by the below equation:

$$t_{packet} = (t_{data} + t_{CSI} + t_{parity}) + t_{off,min} \quad \text{Equation 4}$$

where $t_{data}$ is the time required to transmit one or more data bits (e.g., the speed pulse and bit numbers 0-4), $t_{CSI}$ is the time required to transmit one or more CSI bits (e.g., bit numbers 5-7), $t_{parity}$ is the time required to transmit the parity bit (e.g., bit number 8), $t_{off,min}$ is the minimum off time reserved between words, and $t_{packet}$ is the total time to transmit the full fidelity packet.

Frequency bands corresponding to different modes of operation having different resolutions may then be defined as:

$$f_0 = [2^n \times t_{packet}]^{-1},\ f_1 = [2^{n-1} \times t_{packet}]^{-1},\ \ldots,\ f_n = [2 \times t_{packet}]^{-1},\ f_{max} = [2 \times t_{data}]^{-1} \quad \text{Equation 5}$$

where $f_0$ represents the highest resolution frequency band available, $f_1$ represents the next highest resolution frequency band available, and $f_n$ represents the lowest resolution frequency band available. A frequency band $f_{max}$ is also included. For example, in a frequency band $f_{max}$, frequency of rotation may be so high that pulses of different AK words would collide. However, at frequencies within this band, AK pulses (e.g., CSI bits and the parity bit) could be truncated and not output so that pulses corresponding to one or more data bits (e.g., speed pulse and bit numbers 0-4), for example, could still be transmitted. Such truncation would be necessary for this frequency band to avoid pulse collision between AK protocol words. The resolution of the $f_n$ frequency band and the $f_{max}$ frequency band are equal, though the $f_{max}$ frequency band excludes the one or more CSI bits (e.g., bit numbers 5-7) and the parity bit (e.g., bit number 8).

Looking at equation five, a first frequency band 0 (FB0) may be defined to cover frequencies between 0 Hz and $f_0$, for example. A second frequency band 1 (FB1) may be defined to cover frequencies between $f_0$ and $f_1$. A third frequency band 2 (FB2) may be defined to cover frequencies between $f_1$ and $f_2$. More generally, an n+1 frequency band (FBn) may be defined to cover frequencies between $f_{n-1}$ and $f_n$. That is, the frequencies (f) covered by a frequency band FB0 may include $0<|f|\leq f_0$, the frequencies covered by a frequency band FB1 may include $f_0<|f|\leq f_1$, the frequencies covered by a frequency band FB2 may include $f_1<|f|\leq f_2$, and so on. More generally, the frequencies (f) covered by a frequency band FBn may include $f_{n-1}<|f|\leq f_n$.

The frequency bands may be associated with commutation sequences representing the different commutations that can be output when a target is rotating at a frequency within each frequency band. For example, the commutation sequences may be associated with the frequency bands as shown below in Table 3.

TABLE 3

| Frequency Band | Commutation Sequence |
|---|---|
| 0 | 0 1 2 3 4 5 6 7 |
| 1 | 0 2 4 6 |
| 2 | 0 4 |

That is, for this particular example, when the frequency of rotation of the target is low and falls within frequency band 0 (e.g., high-resolution operation), eight output events (corresponding to commutations 0, 1, 2, 3, 4, 5, 6, 7) may be transmitted per pole pair (see, e.g., plot 610 of FIG. 6). When the frequency of rotation of the target is high and falls within frequency band 2 (e.g., low-resolution operation), two output events (corresponding to commutations 0, 4) may be transmitted per pole pair (see, e.g., plot 640 of FIG. 6). When the frequency of the target is in the middle and falls in frequency band 1 (e.g., mid-resolution operation), four output events (corresponding to commutations 0, 2, 4, 6) may be transmitted per pole pair (see, e.g., plot 630 of FIG. 6). The frequency bands and associated commutation sequences may be programmed into the memory (e.g., memory 124) of a sensor device. A controller (e.g., digital controller 120) of a sensor device may then execute instructions (e.g., frequency ID instructions 114) to determine a frequency at which a target rotates (as discussed earlier), and execute instructions (e.g., band/sequence ID instructions 116) to determine which frequency band the determined frequency falls into and what the corresponding commutation sequence is for that frequency band. The controller may further execute instructions (e.g., output event/commutation ID instructions 118) to determine which of the commutations has been identified (e.g., based on which threshold level value (e.g., $B_{OP}$, $B_{RP}$) has been exceeded and whether it has been exceeded in a measured magnetic field signal, a virtual magnetic field signal, or an angle signal). The controller may still further execute instructions (e.g., pulse generator instructions 119) to generate pulses providing information about the target associated with that commutation and pulses (e.g., bit number 5-7) indicating the particular number in the commutation sequence to which the information relates.

Of course, the above example may be extended to sensor devices that are capable of outputting information at greater or lower resolutions than the $N_{comm}=2^3$ (see Equation 3) example above. For example, if it were desired to provide a n=4 device such that $N_{comm}=2^4$, four frequency bands would be defined, each with a different commutation sequence providing a different level of resolution of information to be output. For example, the commutation sequences may be associated with the frequency bands as shown below in Table 4.

TABLE 4

| Frequency Band | Commutation Sequence |
|---|---|
| 0 | 0 1 2 3 4 5 6 7 8 9 10 11 12 13 14 15 |
| 1 | 0 2 4 6 8 10 12 14 |
| 2 | 0 4 8 12 |
| 3 | 0 8 |

That is, for this particular example, when the frequency of rotation of the target is low and falls within frequency band 0 (e.g., high-resolution operation), sixteen output events (corresponding to commutations 0, 1, 2, 3, 4, 5, 6, 7, 8, 9, 10, 11, 12, 13, 14, 15) may be transmitted per pole pair. When the frequency of rotation of the target is high and falls within frequency band 3 (e.g., low-resolution operation), two output events (corresponding to commutations 0, 8) may be transmitted per pole pair. When the frequency of the target falls into frequency band 1, eight output events (corresponding to commutations 0, 2, 4, 6, 8, 10, 12, 14) may be transmitted per pole pair. When the frequency of the target falls into frequency band 2, four output events (corresponding to commutations 0, 4, 8, 12) may be transmitted per pole pair.

Using the above described techniques, a sensor device may output different numbers of output events corresponding to different commutation sequences depending on the frequency of rotation of the target. The controller of the sensor device may dynamically and in real-time switch between the different frequency band regimes based on the frequency of rotation of the target. This allows the sensor device to take advantage of any free bandwidth available at any given frequency of rotation of a target, such that higher resolutions of information may be provided when the bandwidth is available for that information.

Figure 8:
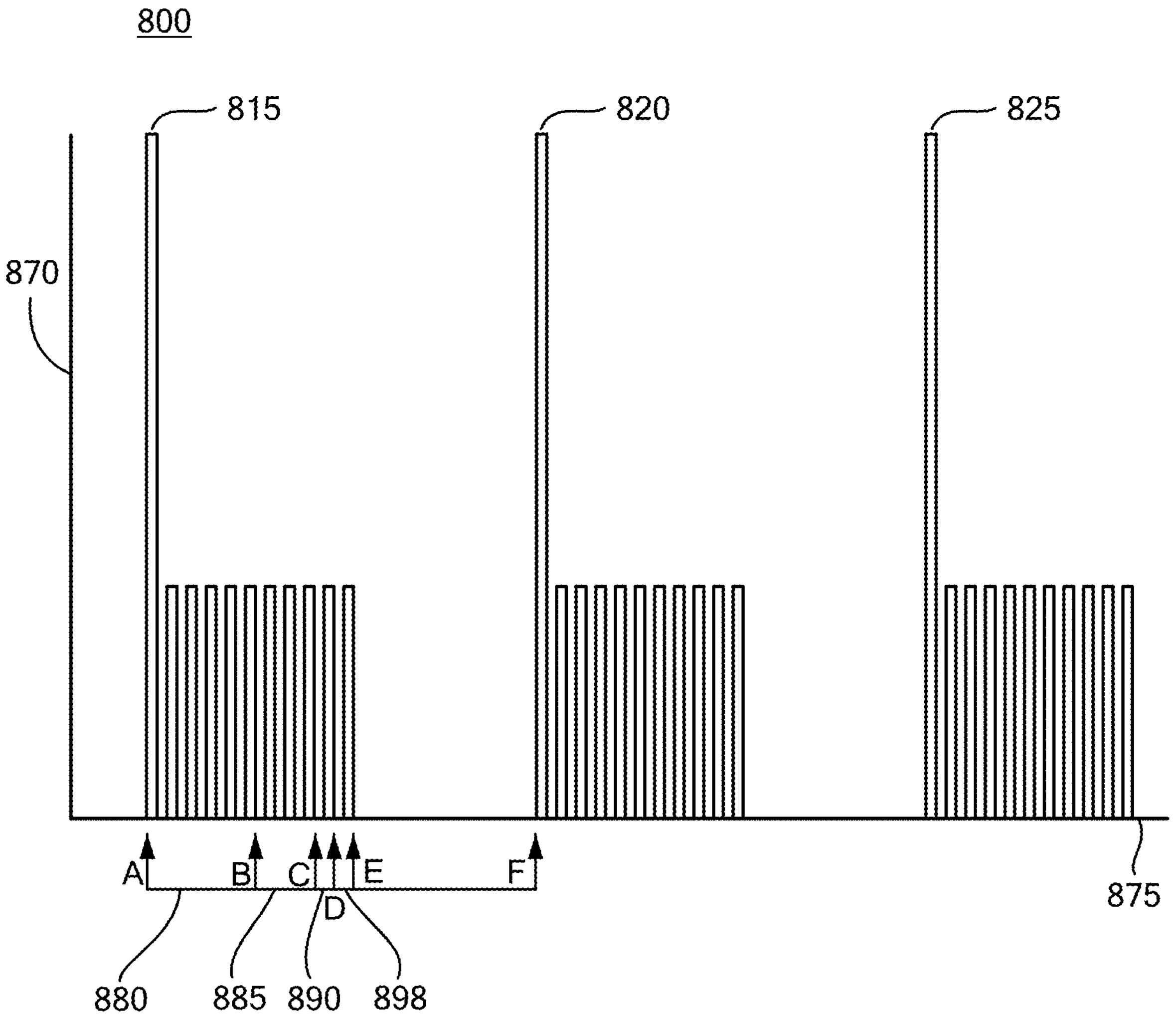
FIG. 8 shows a plot of example modified sets of output current pulses that convey information about a target.

FIG. 8 is a diagram 800 of an example output sequence of example AK protocol words (see, e.g., FIG. 7A and associated description) from a sensor device. For example, pulse train 815 represents one example AK protocol word, pulse train 820 represents another example AK protocol word, and pulse train 825 represents yet another example AK protocol word. Y-axis 870 of diagram 800 represents amplitude of current and X-axis 875 of diagram 800 represents time. Using the example bits described with respect to Table 1 above, the time between point A and point B in FIG. 8 may represent an amount of time 880 needed to transmit a speed pulse and bit numbers 0-4 of the example AK protocol word. The time between point B and point C in FIG. 8 may represent an amount of time 885 needed to transmit bit numbers 5-7 (e.g., CSI bits) of the example AK protocol word. A time between point E and F in FIG. 8 may represent a minimum off time reserved to avoid collision between pulses trains and during which no pulses may be transmitted. In embodiments where a sensor device is a n=4 sensor device, the sixteen different possible commutations cannot be represented by bits 5-7 (which can only represent 8 possible states). Accordingly, bit number 8 (between times C and D 890) may be used as a fourth CSI bit. With a total of 4 CSI bits, 16 different commutation states can be represented. An additional pulse representing another bit (e.g., bit number 9) may be added on the end of the pulse train between times D and E 898 to provide the parity bit (e.g., bit number 9 may be the parity bit instead of bit number 8).

The example bits discussed above with respect to the pulse trains in FIGS. 7B and 8 are examples. Any number of bits providing any combination of information regarding a target may be provided in a pulse train in accordance with AK protocol. Moreover, as discussed with respect to the specific examples above, rather than utilize bits 5-7 as CSI bits, bits 5-7 may be used to represent other information (e.g., air gap information) at all commutations, and additional bits may be added onto the end of the pulse trains (but before the parity bit) to represent the commutations. In such a case, for a n=3 sensor device, 3 bits would need to be added to the end of a pulse train (but before the parity bit), for a n=4 sensor device, 4 bits would need to be added to the end of a pulse train (but before the parity bit), and for an n sensor device, n bits would need to be added to the end of a pulse train (but before the parity bit). A person of ordinary skill in the art will recognize that any number of frequency bands and commutation sequences may be programmed into a sensor device. That is, identifying additional commutations would only require generating and monitoring threshold level values in additional virtual channels and/or threshold level values in an angle signal, and outputting output events for those commutations when bandwidth is available would only require appending enough bits to represent the number of possible commutations at the highest resolution frequency band.

The disclosure herein should not be limited to transmission of information using an AK protocol. A person of ordinary skill in the art would recognize that the systems, methods, and techniques described herein may be applicable to a variety of known event-based output protocols, and use of these systems, methods, and techniques with these protocols should be considered to be within the scope of this disclosure.

The disclosure herein should also not be limited to conveying the specific types of information (e.g., speed, direction) discussed above regarding a target. A person of skill in the art will recognize that the systems, methods, and techniques described herein may be used for a variety of different types of information (e.g., outputting of information from angle sensor devices) in a variety of different applications where information is output using an event-based output protocol.

Figure 9:
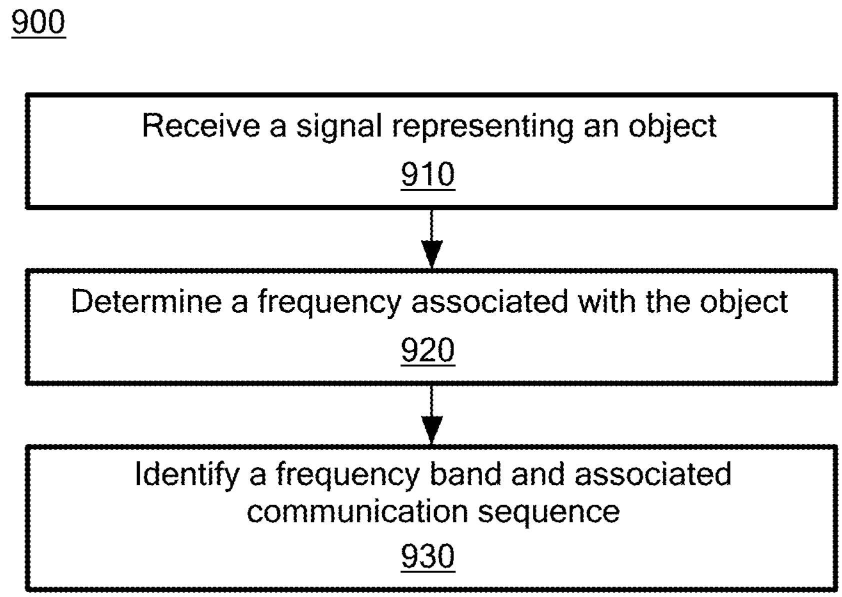
FIG. 9 shows an example process for identifying a frequency band and associated commutation sequence for use in outputting information about a target, consistent with embodiments of the present disclosure.

FIG. 9 shows a flow diagram of an example process 900 for identifying a frequency band and associated commutation sequence for use in outputting information about a target, consistent with embodiments of the present disclosure. Example process 900 may be implemented by one or more controllers (e.g., digital controller 120) of a sensor device (e.g., sensor device 115, sensor device 155, sensor device 185).

In 910, a signal may be received representing an object (e.g., magnetic target). For example, a magnetic field signal (e.g., magnetic field signal 109A, magnetic field 109B) or channel output signal (e.g., channel output signal 46A, channel output signal 46B) may be received by a controller (e.g., digital controller 120) of a sensor device (e.g., sensor device 115, sensor device 155, sensor device 185). As previously discussed, the magnetic field signal may be a measured magnetic field signal (e.g., magnetic field signal 109A, magnetic field signal 109B) or a virtual magnetic field signal. As also previously discussed a channel output signal may be a measured channel output signal (e.g., channel output signal 46A, channel output signal 46B) based on a measured magnetic field signal crossing threshold level values, a virtual channel output signal based on a virtual magnetic field signal crossing threshold level values, or a channel output signal based on an angle signal crossing threshold level values.

In 920, a frequency of rotation associated with the object (e.g., magnetic target) may be determined. For example, a controller (e.g., digital controller 120) of a sensor device may execute instructions (e.g., frequency ID instructions 114) to calculate a frequency of rotation of the object. As previously discussed, the controller may use a system clock to timestamp channel switching events as detected by a channel output signals, and may then utilize the time between two of the same type of channel switching event to calculate a frequency of rotation of the target for any given pole pair. For example, a first time may be associated with a channel output event transitioning from a 0 to a 1 (e.g., a $B_{OP}$ threshold level value being crossed by a magnetic field signal), and a second time may be associated with the next channel output event transitioning from a 0 to a 1 (e.g., Bop threshold level value again being crossed by the magnetic field signal). The difference between the first and second times may then be calculated, and the inverse of that time determined to calculate frequency, as shown in equation 2 above.

Alternatively, the frequency may be determined based on times between channel output events transitioning from 1 to 0 (e.g., between $B_{RP}$ threshold level values being crossed by a magnetic field signal). In some embodiments, the frequency may be determined based on times between virtual channel output events, or channel output events corresponding to threshold level values being exceeded in an angle signal. A person of ordinary skill in the art would recognize that there are many other ways to determine frequency of rotation of a target based on magnetic field signals. Any known technique for determining a frequency of rotation of a target should be considered to be within the scope of the disclosure herein.

In 930, a frequency band and associated commutation sequence may be identified. For example, a controller (e.g., digital controller 120) of a sensor device may execute instructions (e.g., band/sequence ID instructions 116) that cause the controller to compare the frequency determined in 920 with frequency bands defined in memory to identify which frequency band the determined frequency falls into. In some embodiments, the identified frequency band may correspond to a first frequency band out of a number of possible frequency bands (e.g., three frequency bands) stored in the memory of the sensor device. The controller may then identify an associated commutation sequence associated with that frequency band, indicating the commutations that should be transmitted out of the sensor device when the target is rotating at a frequency within that frequency band. In some embodiments, the controller may continuously calculate a frequency of rotation of the target and dynamically switch between commutation sequences to be output (e.g., different resolutions) in real-time to continuously output a resolution of information that takes advantage of available bandwidth. Alternatively, the controller may periodically calculate frequency of target rotation and switch between commutation sequences to be output.

Figure 10:
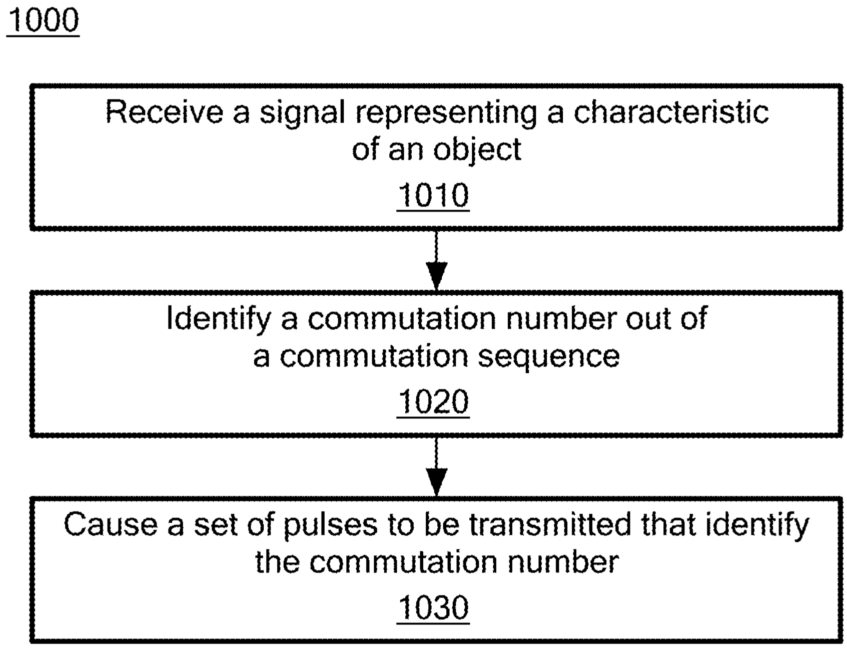
FIG. 10 shows an example process for identifying a commutation out of a commutation sequence and conveying information identifying the commutation, consistent with embodiments of the present disclosure.

FIG. 10 shows a flow diagram of an example process 1000 for identifying a commutation out of a commutation sequence and conveying information identifying the commutation, consistent with embodiments of the present disclosure. In 1010, a signal representing a characteristic of an object (e.g., magnetic target) may be received. For example, a controller (e.g., digital controller 120) of a sensor device (e.g., sensor device 115, sensor device 155, sensor device 185) may receive a channel output signal. As previously discussed, the channel output signal may be a measured channel output signal, a virtual channel output signal, or a channel output signal corresponding to an angle signal. The channel output signal may switch states when a magnetic field signal or angle signal crosses a threshold level value (e.g., $B_{OP}$, $B_{RP}$).

In 1020, a commutation out of a commutation sequence may be identified. For example, as discussed above with respect to process 900 of FIG. 9, a controller (e.g., digital controller 120) of a sensor device may determine a frequency at which a target rotates, which frequency band that determined frequency corresponds to, and which commutation sequence is associated with that frequency band. The controller may also determine that a commutation has occurred when a channel output signal switches states. The controller may execute instructions (e.g., output event/commutation ID instructions 118) to determine which of the commutations in the commutation sequence the commutation corresponds to. For example, the particular commutation may be identified based on which threshold level value (e.g., $B_{OP}$, $B_{RP}$) has been crossed and from which signal (e.g., measured output channel signal, virtual output channel signal, angle signal) the commutation was identified.

In 1030, a set of one or more pulses may be transmitted that identify the commutation. For example, a controller (e.g., digital controller 120) may execute instructions (e.g., pulse generator instructions 119) to cause one or more pulses to be generated identifying the commutation. In some embodiments, the controller may cause a series of pulses (i.e., a pulse train) (see, e.g., FIGS. 7A, 7B, 8) to be generated representing additional information about the target (e.g., speed pulse, direction, air gap) as determined by the controller, as well as an identification of which commutation (e.g., commutation 2) in a commutation sequence the information corresponds to. As previously discussed, any number of different output protocols may be used, and the controller may be programmed send instructions to an appropriate output interface (e.g., current source 128, transistor 148, output interface 190) to cause the output interface to generate a series of pulses conveying the additional information and identification information in a format conforming to the particular output protocol being used. In some embodiments, the set of one or more pulses and/or series of pulses may be transmitted in an AK protocol format. In some embodiments, one of the one or more pulses corresponds to a bit added into an AK protocol word to identify a commutation in a commutation sequence.

Figure 11:
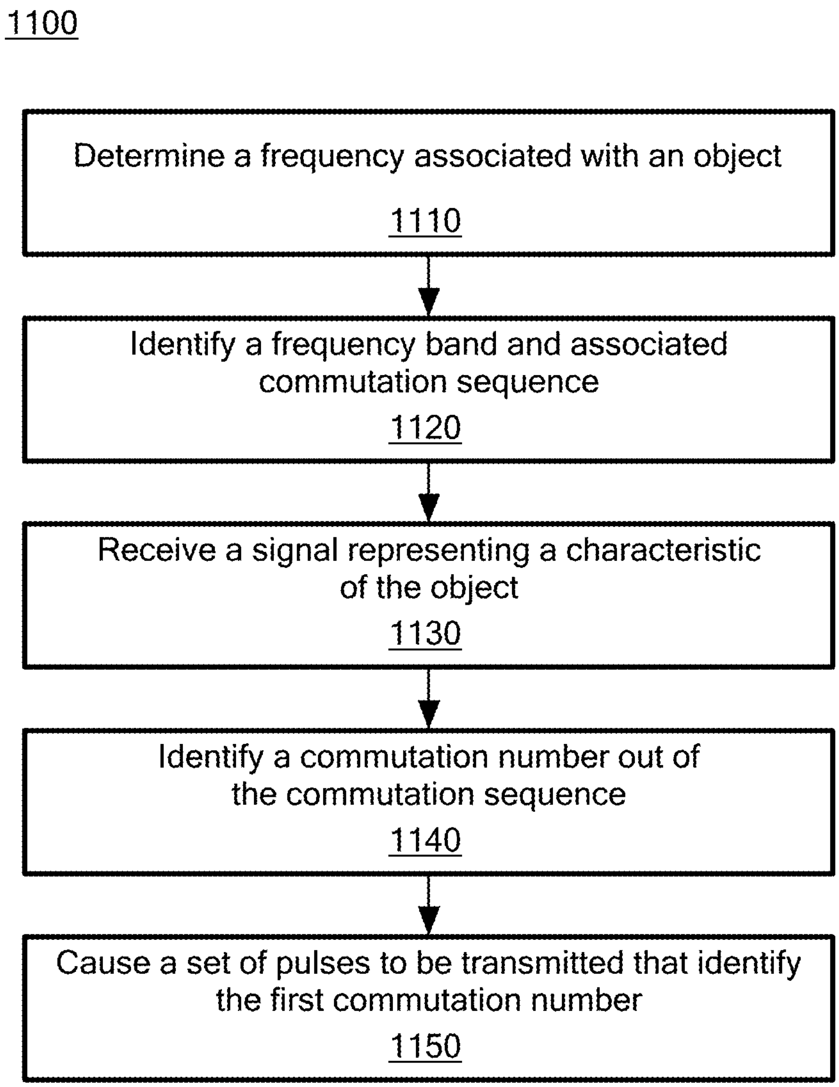
FIG. 11 shows an example process for identifying a frequency band and associated commutation sequence for use in outputting information about a target, and for identifying a commutation out of the commutation sequence and conveying information identifying the commutation, consistent with embodiments of the present disclosure.

FIG. 11 shows an example process 1100 for identifying a frequency band and associated commutation sequence for use in outputting information about a target, and for identifying a commutation out of the commutation sequence and conveying information identifying the commutation, consistent with embodiments of the present disclosure. For example, process 1100 may be performed by a controller (e.g., digital controller 120) in a sensor device (e.g., sensor device 115, sensor device 155, sensor device 185) executing instructions stored in memory.

In 1110, a frequency associated with an object (e.g., magnetic target) may be determined. For example, a frequency of rotation of a target may be determined by a controller (e.g., digital controller 120) of a sensor device as discussed above with respect to 920 of FIG. 9. In 1120, a frequency band and associated commutation sequence may be identified. For example, the controller may identify a frequency band and associated commutation sequence as discussed above with respect to 930 of FIG. 9. In some embodiments, the identified frequency band may correspond to a first frequency band out of a number of possible frequency bands (e.g., three frequency bands) stored in the memory of the sensor device.

In 1130, a signal representing a characteristic of an object (e.g., magnetic target) may be received. For example, the controller may receive a channel output signal (e.g., measured channel output signal, virtual channel output signal, channel output signal corresponding to an angle signal) as discussed above with respect to 1010 of FIG. 10. In 1140, a commutation out of the commutation sequence may be identified. For example, the controller may determine which commutation out of a commutation sequence a commutation identified in the channel output signal corresponds to, as discussed above with respect to 1020 of FIG. 10.

In 1150, one or more pulses may be generated identifying the commutation. For example, the controller may send instructions to an output interface (e.g., current source 128, transistor 148, output interface 190) causing one or more pulses to be transmitted identifying the commutation. In some embodiments, the controller may send instructions to the output interface to cause a set of pulses (i.e., a pulse train) to be transmitted conveying additional information about the target and identifying the commutation that the information corresponds to, as discussed above with respect to 1030 of FIG. 10. In some embodiments, the one or more pulses and/or set of pulses may be transmitted in an AK protocol format. In some embodiments, one of the one or more pulses corresponds to a bit added into an AK protocol word to identify a commutation in a commutation sequence.

Figure 12:
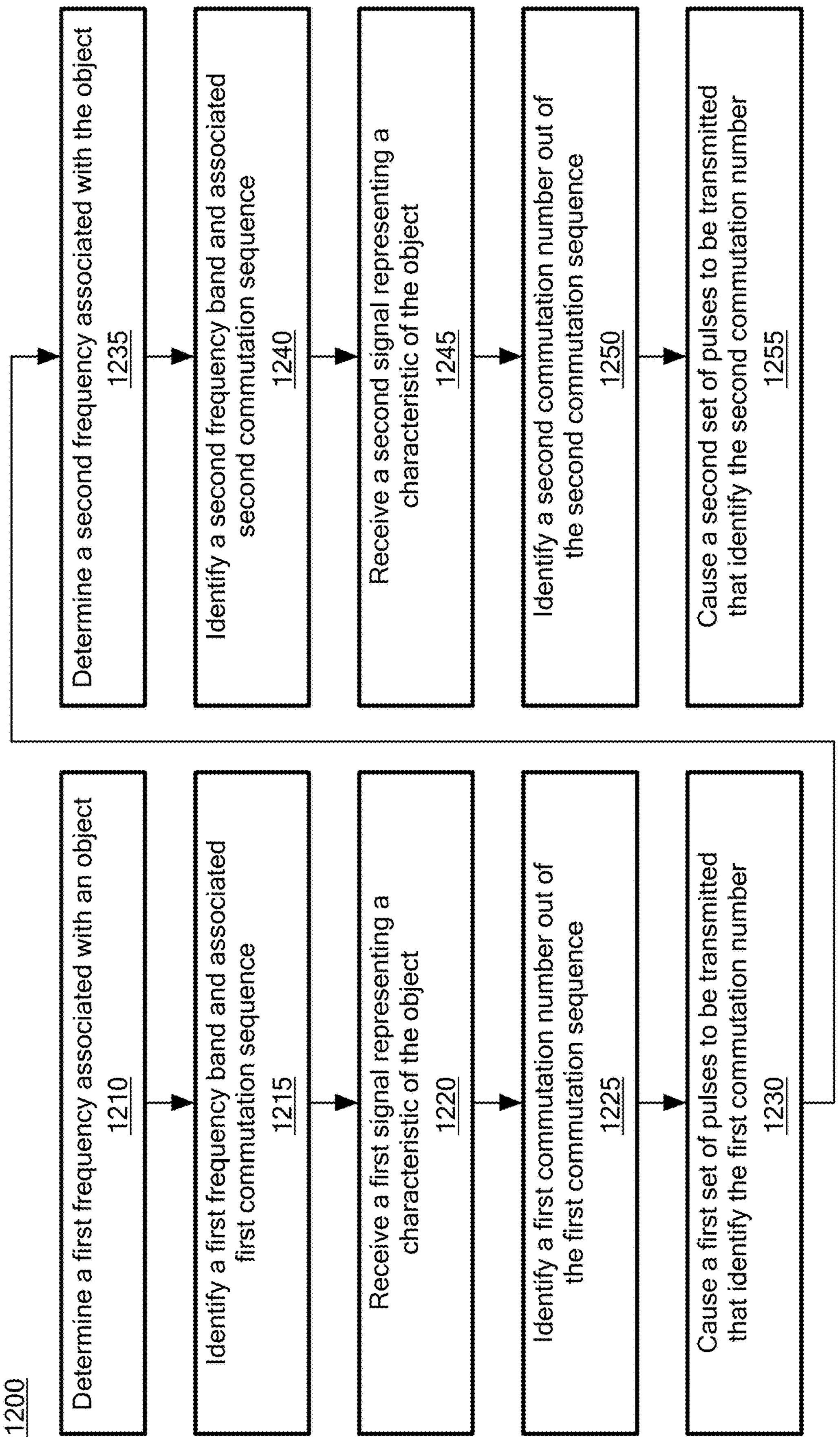
FIG. 12 shows an example process for causing a first set of pulses to be transmitted that identify a first commutation of a first commutation sequence and for causing a second set of pulses to be transmitted that identify a second commutation of a second commutation sequence, consistent with embodiments of the present disclosure.

FIG. 12 shows an example process 1200 for causing a first set of pulses to be transmitted that identify a first commutation of a first commutation sequence and for causing a second set of pulses to be transmitted that identify a second commutation of a second commutation sequence, consistent with embodiments of the present disclosure. For example, process 1200 may be performed by a controller (e.g., digital controller 120) executing instructions stored in memory (e.g., memory 124) of a sensor device (e.g., sensor device 115, sensor device 155, sensor device 185).

In 1210, a first frequency associated with an object (e.g., magnetic target) may be determined. For example, a controller (e.g., digital controller 120) of a sensor device may determine a frequency of rotation of an object, as discussed above with respect to 920 of FIG. 9 and with respect to 1110 of FIG. 11. In 1215, a first frequency band and associated first commutation sequence may be identified. For example, the controller may identify a frequency band and associated commutation sequence based on the determined first frequency as discussed above with respect to 930 of FIG. 9 and as discussed above with respect to 1120 of FIG. 11. In some embodiments, the identified first frequency band may correspond to a first frequency band out of a number of possible frequency bands (e.g., three frequency bands) stored in the memory of the sensor device. The first frequency band may be associated with a first resolution of information to be output from the sensor device based on the first frequency band. That is, the associated first commutation sequence may be representative of a first resolution of information.

In 1220, a first signal representing a characteristic of the object (e.g., magnetic target) may be received. For example, the controller may receive a channel output signal (e.g., measured channel output signal, virtual channel output signal, channel output signal corresponding to an angle signal) as discussed above with respect to 1010 of FIG. 10 and with respect to 1130 of FIG. 11. In 1225, a first commutation out of the first commutation sequence may be identified. For example, the controller may determine which commutation out of a commutation sequence a commutation identified in the channel output signal corresponds to, as discussed above with respect to 1020 of FIG. 10 and with respect to 1140 of FIG. 11.

In 1230, a first set of one or more pulses may be transmitted that identify the first commutation. For example, the controller may send instructions to an output interface (e.g., current source 128, transistor 148, output interface 190) causing one or more pulses to be transmitted that identify the commutation. In some embodiments, the controller may send instructions to the output interface to cause a set of pulses (i.e., a pulse train) to be transmitted conveying additional information about the target and identifying the commutation that the information corresponds to, as discussed above with respect to 1030 of FIG. 10 and with respect to 1150 of FIG. 11. In some embodiments, the set of one or more pulses may be transmitted in an AK protocol format. In some embodiments, one of the one or more pulses corresponds to a bit added into an AK protocol word to identify a commutation in a commutation sequence.

In 1235, a second frequency associated with the object may be determined. For example, the controller may determine a second frequency of rotation of the object at a second time, as discussed above with respect to 920 of FIG. 9 and with respect to 1110 of FIG. 11. This second frequency may be different than the first frequency. That is, the rotation speed of the target may have sped up or slowed down since the first frequency was determined. In 1240, a second frequency band and associated second commutation sequence may be identified. For example, the controller may identify a frequency band and associated commutation sequence based on the second determined frequency as discussed above with respect to 930 of FIG. 9 and as discussed above with respect to 1120 of FIG. 11. This second frequency band and associated second commutation sequence may be different than the identified first frequency band and first commutation sequence due to the second frequency being different than the first frequency. In some embodiments, the identified second frequency band may correspond to a second frequency band out of a number of possible frequency bands (e.g., three frequency bands) stored in the memory of the sensor device. The second frequency band may be associated with a second resolution of information to be output from the sensor device based on the second frequency band. That is, the associated second commutation sequence may be representative of a second resolution of information. In some embodiments, the first determined frequency may be higher than the second determined frequency, and the first resolution of information may be lower than the second resolution of information. In some embodiments, the first determined frequency may be lower than the second determined frequency, and the first resolution of information may be higher than the second resolution of information.

In 1245, a second signal representing a characteristic of the object may be determined. For example, the controller may receive another channel output signal (e.g., measured channel output signal, virtual channel output signal, channel output signal corresponding to an angle signal) as discussed above with respect to 1010 of FIG. 10 and with respect to 1130 of FIG. 11. In 1250, a second commutation out of the second commutation sequence may be identified. For example, the controller may determine which commutation out of a commutation sequence a commutation identified in the channel output signal corresponds to, as discussed above with respect to 1020 of FIG. 10 and with respect to 1140 of FIG. 11. This second commutation may be different than the first commutation, and the second commutation sequence may different than the first commutation sequence due to the second frequency being different than the first frequency.

In 1255, a second set of one or more pulses may be transmitted that identify the second commutation. For example, the controller may send instructions to an output interface (e.g., current source 128, transistor 148, output interface 190) causing one or more pulses to be transmitted that identify the second commutation. In some embodiments, the controller may send instructions to the output interface causing a set of pulses (i.e., a pulse train) to be transmitted conveying additional information about the target and identifying the commutation that the information corresponds to, as discussed above with respect to 1030 of FIG. 10 and with respect to 1150 of FIG. 11. However, the second set of pulses may differ from the first set of pulses to represent different information based on a different identified commutation, and to represent a different commutation number out of a different commutation sequence. In some embodiments, the set of one or more pulses may be transmitted in an AK protocol format. In some embodiments, one of the one or more pulses corresponds to a bit added into an AK protocol word to identify a commutation in a commutation sequence.

Although systems, methods, and techniques disclosed herein have been primarily discussed herein with respect to magnetic sensors, a person of ordinary skill in the art would recognize that the systems, methods, and techniques described herein may be used to change a resolution of information being output for any type of system utilizing an event-based output communication protocol. The systems, methods, and techniques were described with reference to magnetic speed and direction sensor systems by way of example to explain the details of the disclosure, but the scope of systems, methods, and techniques described herein should not be limited to these examples.

As used herein, the term “processor” or “controller” is used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

Various embodiments of the systems, methods, and techniques are described herein with reference to the related drawings. Alternative embodiments can be devised without departing from the scope of the described concepts. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to element or structure A over element or structure B include situations in which one or more intermediate elements or structures (e.g., element C) is between elements A and B regardless of whether the characteristics and functionalities of elements A and/or B are substantially changed by the intermediate element(s).

Furthermore, it should be appreciated that relative, directional or reference terms (e.g. such as “above,” “below,” “left,” “right,” “top,” “bottom,” “vertical,” “horizontal,” “front,” “back,” “rearward,” “forward,” etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an “upper” or “top” surface can become a “lower” or “bottom” surface simply by turning the object over. Nevertheless, it is still the same surface and the object remains the same. Also, as used herein, “and/or” means “and” or “or,” as well as “and” and “or.” Moreover, all patent and non-patent literature cited herein is hereby incorporated by references in their entirety.

The terms “disposed over,” “overlying,” “atop,” “on top,” “positioned on” or “positioned atop” mean that a first element, such as a first structure, is present on a second element, such as a second structure, where intervening elements or structures (such as an interface structure) may or may not be present between the first element and the second element. The term “direct contact” means that a first element, such as a first structure, and a second element, such as a second structure, are connected without any intermediary elements or structures between the interface of the two elements. The term “connection” can include an indirect connection and a direct connection.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to “one embodiment,” “an embodiment,” “some embodiments,” or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described with reference to one embodiment, knowledge of one skilled in the art may be relied upon to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method, comprising:

determining a first frequency associated with an object;

identifying a first frequency band and first commutation sequence associated with the first frequency band based on the determined first frequency;

receiving a first signal representing a characteristic of the object;

identifying a first commutation out of the first commutation sequence based on the received first signal;

causing a first set of one or more pulses to be transmitted that identify the first commutation;

determining a second frequency associated with the object;

identifying a second frequency band and second commutation sequence associated with the second frequency band based on the determined second frequency;

receiving a second signal representing a characteristic of the object;

identifying a second commutation out of the second commutation sequence based on the received second signal; and causing a second set of one or more pulses to be transmitted that identify the second commutation.

2. The method of claim 1, wherein the object is a magnetic target and the received first signal represents a magnetic field generated by the magnetic target and detected by a magnetic field sensing element.

3. The method of claim 1, further comprising causing additional pulses to be transmitted with the first set of one or more pulses to provide additional information about the object.

4. The method of claim 1, wherein the first frequency band and the second frequency band are each associated with a different resolution at which information about the object is transmitted.

5. The method of claim 1, wherein the first set of one or more pulses and the second set of one or more pulses are transmitted in an AK protocol format.

6. The method of claim 2, wherein the first frequency band is associated with a first frequency of rotation of the magnetic target and the second frequency band is associated with a second frequency of rotation of the magnetic target, wherein the first frequency of rotation is higher than the second frequency of rotation, and wherein the resolution associated with the first frequency band is lower than the resolution associated with the second frequency band.

7. The method of claim 3, wherein the additional pulses correspond to bits of a word in an AK protocol format, and at least one of the pulses in the second set of one or more pulses corresponds to a bit added into the word.

8. The method of claim 3, wherein the additional pulses correspond to bits of a word in an AK protocol format, and at least one of the pulses in the second set of one or more pulses corresponds to a bit of the word.

9. The method of claim 1, wherein causing the first set of one or more pulses to be transmitted includes controlling a current source to modulate the one or more pulses of the first set as current pulses on a conductor.

10. The method of claim 1, wherein causing the first set of one or more pulses to be transmitted includes controlling a voltage source to modulate the one or more pulses of the first set as voltage pulses on a conductor.

11. The method of claim 2, wherein the magnetic target is a ring magnet with sections of alternating magnetic polarity.

12. The method of claim 2, wherein the magnetic field sensing element comprises a giant magnetoresistor (GMR) field sensing element, tunnel magnetoresistor (TMR) field sensing element, Hall effect field sensing element, or receiving coil field sensing element.

13. The method of claim 1, wherein the object is a non-ferrous metal target.

14. A sensor device, comprising:

at least one sensing element arranged to sense a characteristic of an object;

a memory storing instructions; and a digital controller that, when executing the instructions, is configured to:

determine a first frequency associated with the object;

identify a first frequency band and commutation sequence associated with the first frequency band based on the determined first frequency;

receive a first signal representing a characteristic of the object;

identify a first commutation out of the first commutation sequence based on the received first signal;

cause a first set of one or more pulses to be transmitted that identify the first commutation;

determine a second frequency associated with the object;

identify a second frequency band and second commutation sequence associated with the second frequency band based on the determined second frequency;

receive a second signal representing a characteristic of the object;

identify a second commutation out of the second commutation sequence based on the received second signal; and cause a second set of one or more pulses to be transmitted that identify the second commutation.

15. The sensor device of claim 14, wherein the object is a magnetic target, the at least one sensing element is a magnetic field sensing element, and the received first signal represents a magnetic field generated by the magnetic target and detected by the magnetic field sensing element.

16. The sensor device of claim 14, wherein the digital controller, when executing the instructions, is further configured to cause additional pulses to be transmitted with the first set of one or more pulses to provide additional information about the object.

17. The sensor device of claim 14, wherein the first frequency band and the second frequency band are each associated with a different resolution at which information about the object is transmitted.

18. The sensor device of claim 14, wherein the first set of one or more pulses and the second set of one or more pulses are transmitted in an AK protocol format.

19. The sensor device of claim 15, wherein the first frequency band is associated with a first frequency of rotation of the magnetic target and the second frequency band is associated with a second frequency of rotation of the magnetic target, wherein the first frequency of rotation is higher than the second frequency of rotation, and wherein the resolution associated with the first frequency band is lower than the resolution associated with the second frequency band.

20. The sensor device of claim 16, wherein the additional pulses correspond to bits of a word in an AK protocol format, and at least one of the pulses in the second set of one or more pulses corresponds to a bit added into the word.

21. The sensor device of claim 16, wherein the additional pulses correspond to bits of a word in an AK protocol format, and at least one of the pulses in the second set of one or more pulses corresponds to a bit of the word.

22. The sensor device of claim 14, wherein the at least one sensing element is arranged to sense fluctuations in a magnetic field caused by a biasing magnet placed proximate to the object.

23. A method comprising:

determining a frequency associated with an object;

identifying a first frequency band out of at least three possible frequency bands based on the determined frequency, each of the at least three possible frequency bands having an associated commutation sequence;

receiving a signal representing a characteristic of the object;

identifying a first commutation out of the commutation sequence associated with the first frequency band based on the received signal; and causing a set of one or more pulses to be transmitted that identify the first commutation.

* * * * *